US012619530B2

(12) United States Patent
Nagai

(10) Patent No.: US 12,619,530 B2
(45) Date of Patent: May 5, 2026

(54) MEMORY SYSTEM

(71) Applicant: Kioxia Corporation, Tokyo (JP)

(72) Inventor: Koichi Nagai, Tokyo (JP)

(73) Assignee: Kioxia Corporation, Tokyo (JP)

( * ) Notice: Subject to any disclaimer, the term of this patent is extended or adjusted under 35 U.S.C. 154(b) by 2 days.

(21) Appl. No.: 18/598,318

(22) Filed: Mar. 7, 2024

(65) Prior Publication Data

US 2024/0303189 A1 Sep. 12, 2024

(30) Foreign Application Priority Data

Mar. 9, 2023 (JP) ................................. 2023-036753

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ......... G06F 12/0246; G06F 2212/7201; G06F 2212/1032; G06F 2212/1052; G06F 2212/7204; G06F 2212/7205; G06F 3/0652; G06F 3/064; G06F 3/0665; G06F 3/0679; G11C 29/42
See application file for complete search history.

(56) References Cited

U.S. PATENT DOCUMENTS

| | | |
|---|---|---|
| 9,632,727 B2 | 4/2017 | Flynn et al. |
| 10,353,612 B2 | 7/2019 | Kanno |
| 10,403,369 B2 | 9/2019 | Lin |
| 10,818,367 B2 | 10/2020 | Yun et al. |
| 10,922,011 B2 | 2/2021 | Cheon et al. |
| 2013/0254463 A1* | 9/2013 | Matsunaga ......... G06F 12/0246 711/103 |
| 2016/0274800 A1 | 9/2016 | Earhart |
| 2019/0310780 A1* | 10/2019 | Gholamipour ........ G06F 3/0679 |
| 2020/0081832 A1* | 3/2020 | Hsu ..................... G06F 12/0253 |
| 2020/0242021 A1* | 7/2020 | Gholamipour ...... G06F 11/1456 |
| 2021/0200447 A1* | 7/2021 | Gupta ................. G06F 12/0246 |
| 2021/0311880 A1* | 10/2021 | Gupta ................. G06F 11/1451 |
| 2021/0405907 A1* | 12/2021 | Nagai ................... G06F 3/0652 |
| 2024/0069799 A1* | 2/2024 | Virani ................... G06F 3/0608 |
| 2024/0289211 A1* | 8/2024 | Singer ................ G06F 11/1012 |

FOREIGN PATENT DOCUMENTS

JP 2022-7376 A 1/2022

* cited by examiner

*Primary Examiner* — Nanci N Wong
(74) *Attorney, Agent, or Firm* — Maier & Maier, PLLC

(57) ABSTRACT

According to one embodiment, a controller, in response to receiving, from a host, a first command requesting secure erase of secure erase target data associated with a first logical area identifier, stores a copy of first mapping information that corresponds to the first logical area identifier, among mapping information that is included in a first table. The controller executes at least a data erase operation for one or more first blocks storing the secure erase target data. In a first mode, the controller, in response to receiving, from the host, a read command that specifies the first logical area identifier, reads data from a storage location corresponding to a first physical address that is mapped to the first logical area identifier in the copy of the first mapping information.

19 Claims, 24 Drawing Sheets

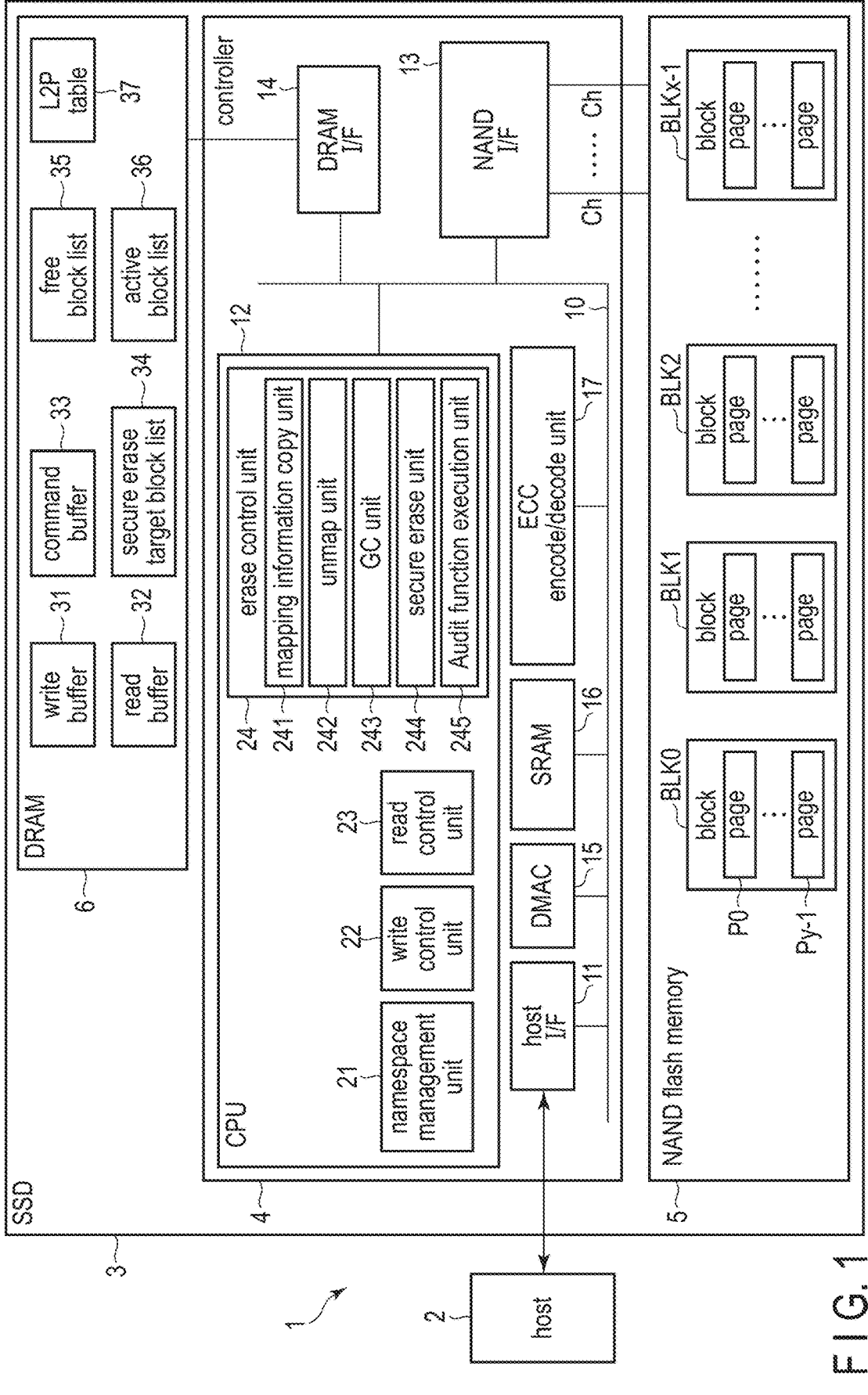
F I G. 1

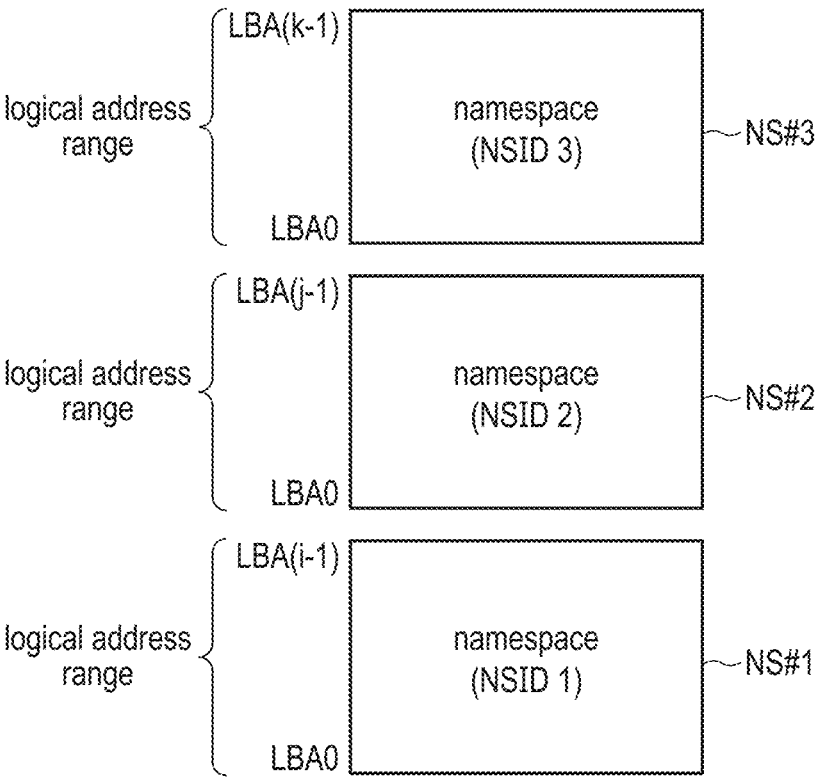
F I G. 3

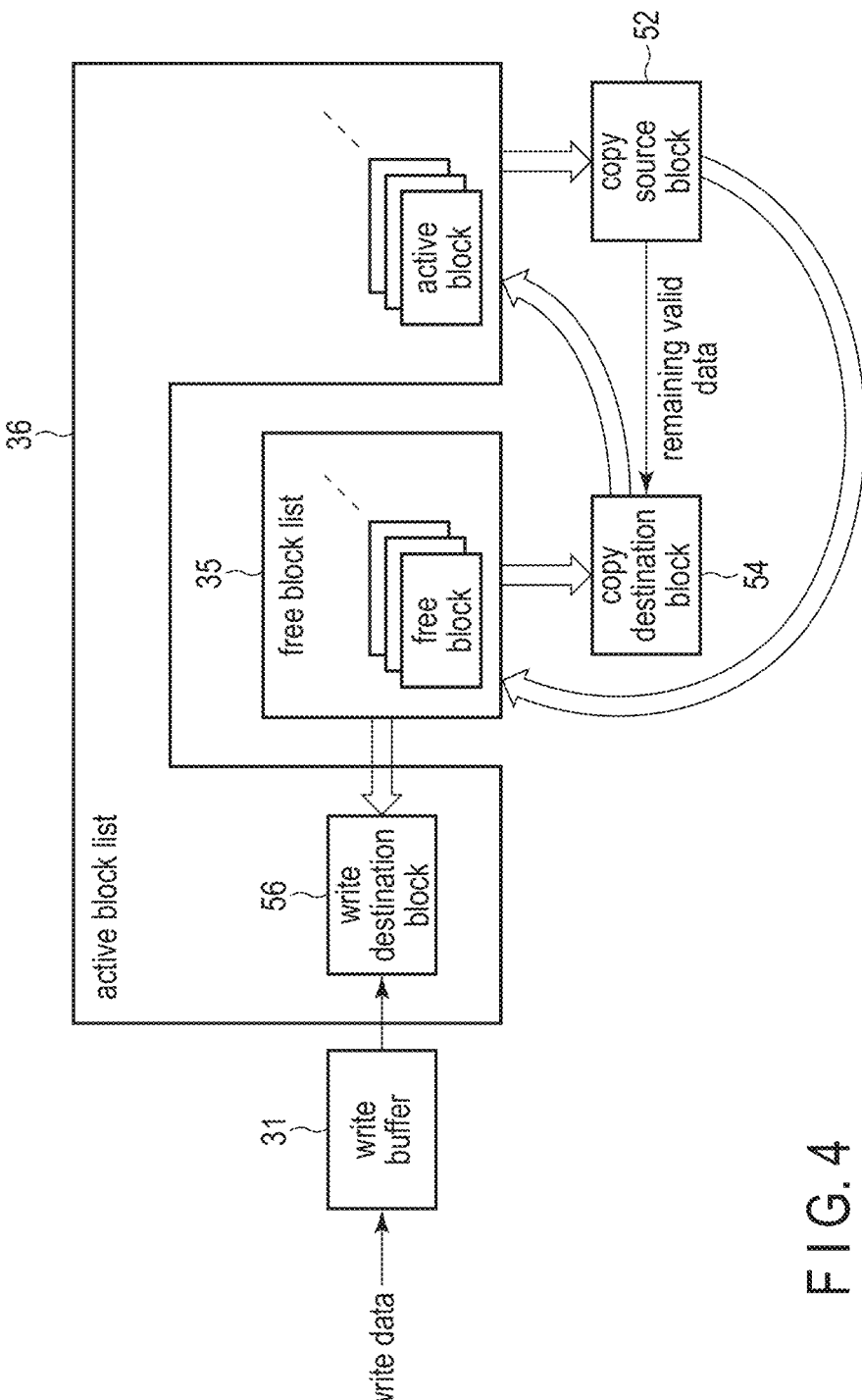
F I G. 4

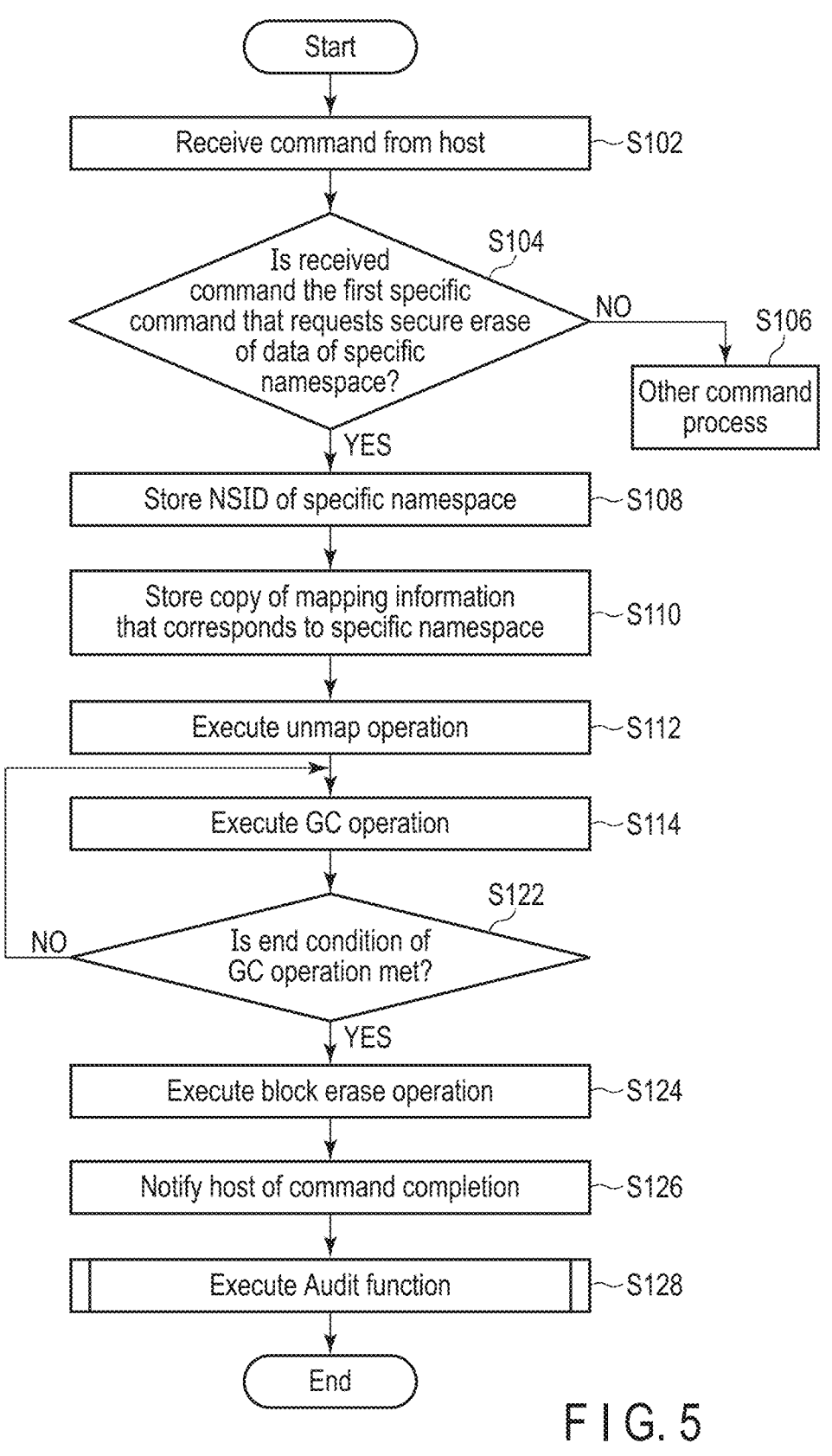
F I G. 5

| page P0 | NSID, LBA | data associated with NSID and LBA | ... | NSID, LBA | data associated with NSID and LBA |
|---|---|---|---|---|---|
| page P1 | NSID, LBA | data associated with NSID and LBA | ... | NSID, LBA | data associated with NSID and LBA |
| ... | ... | ... | ... | ... | ... |
| page Py-1 | NSID, LBA | data associated with NSID and LBA | ... | NSID, LBA | data associated with NSID and LBA |

(a)

| page P0 | NSID, LBA | data associated with NSID and LBA | ... | NSID, LBA | data associated with NSID and LBA |
|---|---|---|---|---|---|
| page P1 | NSID, LBA | data associated with NSID and LBA | ... | NSID, LBA | data associated with NSID and LBA |
| ... | ... | ... | ... | ... | ... |
| page Py-1 | NSID, LBA | data associated with NSID and LBA | ... | list of NSIDs and list of LBAs | |

(b)

F I G. 6

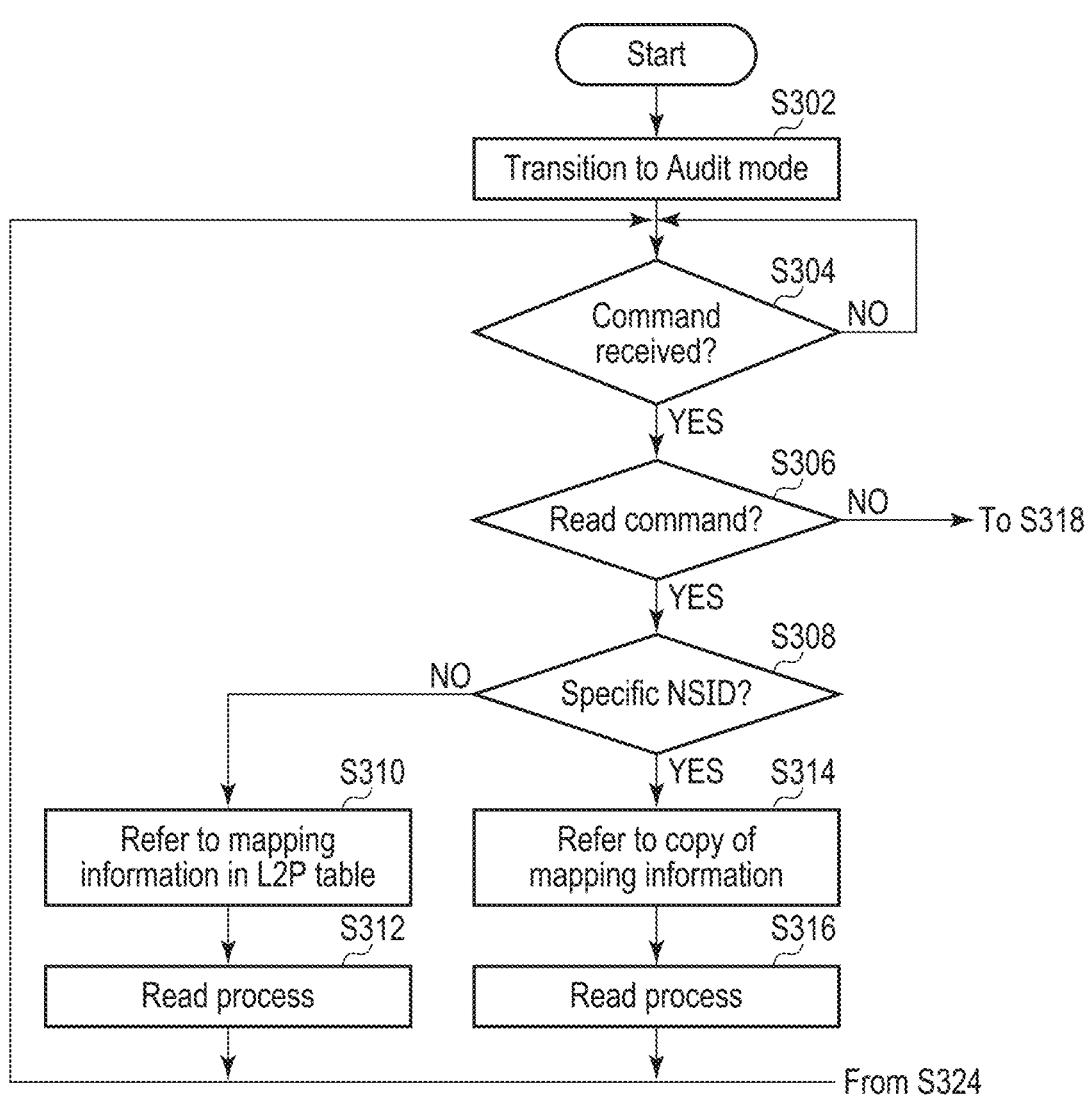
F I G. 7A block BLK0 (partially written active block)

| C:valid data | A:invalid data | A:valid data | B:invalid data |
|---|---|---|---|
| A:valid data | C:valid data | A:valid data | B:valid data |
| B:valid data | A:invalid data | C:valid data | |
| | | | |
| | | | | block BLK1 (fully written active block)

| A:valid data | A:valid data | A:valid data | A:invalid data |
|---|---|---|---|
| B:valid data | C:valid data | B:invalid data | B:valid data |
| C:valid data | A:invalid data | C:valid data | A:valid data |
| A:invalid data | B:invalid data | A:valid data | B:valid data |
| B:valid data | A:valid data | A:invalid data | C:valid data | block BLK2 (fully written active block)

| A:invalid data | A:valid data | A:valid data | B:valid data |
|---|---|---|---|
| A:invalid data | A:invalid data | B:invalid data | B:valid data |
| B:invalid data | A:valid data | A:valid data | A:valid data |
| A:valid data | B:invalid data | A:valid data | B:valid data |
| B:valid data | A:valid data | A:valid data | A:valid data |

F I G. 10A block BLK3 (free block)

| A:invalid data | A:invalid data | A:invalid data | C:invalid data |
|---|---|---|---|
| A:invalid data | A:invalid data | C:invalid data | A:invalid data |
| A:invalid data | A:invalid data | A:invalid data | C:invalid data |
| C:invalid data | A:invalid data | A:invalid data | C:invalid data |
| A:invalid data | C:invalid data | A:invalid data | A:invalid data | block BLK4 (free block)

| B:invalid data | B:invalid data | A:invalid data | C:invalid data |
|---|---|---|---|
| A:invalid data | A:invalid data | C:invalid data | A:invalid data |
| A:invalid data | A:invalid data | A:invalid data | C:invalid data |
| C:invalid data | A:invalid data | A:invalid data | C:invalid data |
| A:invalid data | C:invalid data | A:invalid data | A:invalid data | block BLK5 (free block)

| C:invalid data | A:invalid data | B:invalid data | B:invalid data |
|---|---|---|---|
| C:invalid data | C:invalid data | B:invalid data | B:invalid data |
| A:invalid data | C:invalid data | B:invalid data | B:invalid data |
| B:invalid data | A:invalid data | A:invalid data | B:invalid data |
| A:invalid data | C:invalid data | B:invalid data | B:invalid data | block BLK6 (free block)

| B:invalid data | C:invalid data | B:invalid data | C:invalid data |
|---|---|---|---|
| A:invalid data | B:invalid data | B:invalid data | C:invalid data |
| A:invalid data | B:invalid data | C:invalid data | C:invalid data |
| C:invalid data | A:invalid data | A:invalid data | B:invalid data |
| C:invalid data | C:invalid data | B:invalid data | A:invalid data |

F I G. 10B block BLK0 (partially written active block)

| C:valid data | A:invalid data | A:valid data | B:invalid data |
|---|---|---|---|
| A:valid data | C:valid data | A:valid data | B:invalid data |
| B:invalid data | A:invalid data | C:valid data | |
| | | | |
| | | | | block BLK1 (fully written active block)

| A:valid data | A:valid data | A:valid data | A:invalid data |
|---|---|---|---|
| B:invalid data | C:valid data | B:invalid data | B:invalid data |
| C:valid data | A:invalid data | C:valid data | A:valid data |
| A:invalid data | B:invalid data | A:valid data | B:invalid data |
| B:invalid data | A:valid data | A:invalid data | C:valid data | block BLK2 (fully written active block)

| A:invalid data | A:valid data | A:valid data | B:invalid data |
|---|---|---|---|
| A:invalid data | A:invalid data | B:invalid data | B:invalid data |
| B:invalid data | A:valid data | A:valid data | A:valid data |
| A:valid data | B:invalid data | A:valid data | B:invalid data |
| B:invalid data | A:valid data | A:valid data | A:valid data |

F I G. 11 block BLK6 (fully written active block)
(block-erase free block BLK6 and then store valid data of blocks BLK1 and BLK2)

| A:valid data(B) | A:valid data(C) | A:valid data(B) | C:valid data(C) |
|---|---|---|---|
| C:valid data(A) | C:valid data(B) | A:valid data(B) | A:valid data(C) |
| A:valid data(A) | C:valid data(B) | A:valid data(C) | A:valid data(C) |
| A:valid data(C) | A:valid data(A) | A:valid data(A) | A:valid data(B) |
| A:valid data(C) | A:valid data(C) | A:valid data(B) | A:valid data(A) | block BLK5 (partially written active block)
(block-erase free block BLK5 and then store valid data of block BLK0)

| C:valid data(C) | A:valid data(A) | A:valid data(B) | C:valid data(B) |
|---|---|---|---|
| A:valid data(C) | C:valid data(C) | (B) | (B) |
| (A) | (C) | (B) | (B) |
| (B) | (A) | (A) | (B) |
| (A) | (C) | (B) | (B) |

F I G. 12A block BLK0 (free block by GC operation) (block-erased)

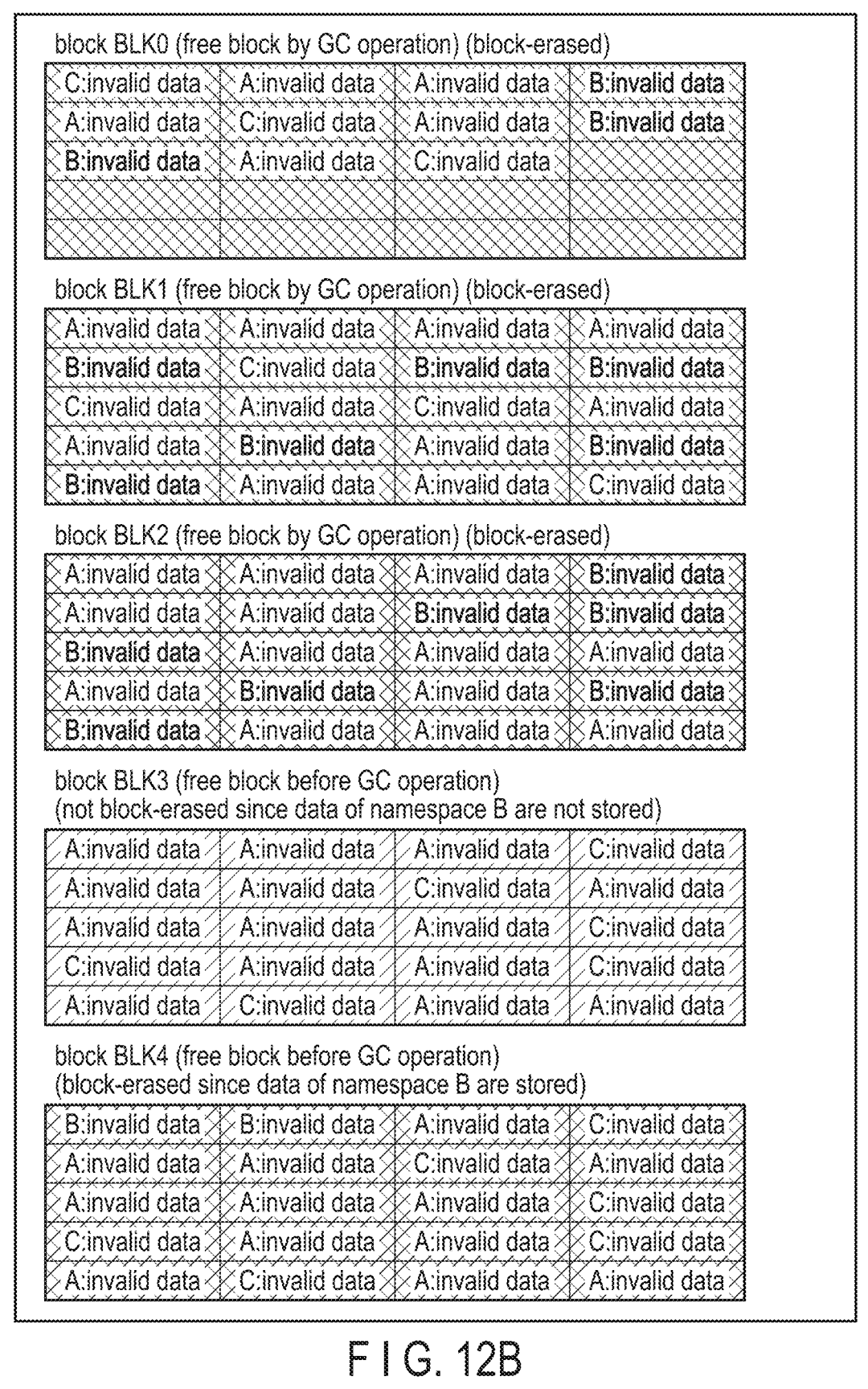

| | | | |
|---|---|---|---|
| C:invalid data | A:invalid data | A:invalid data | B:invalid data |
| A:invalid data | C:invalid data | A:invalid data | B:invalid data |
| B:invalid data | A:invalid data | C:invalid data | |
| | | | |
| | | | | block BLK1 (free block by GC operation) (block-erased)

| | | | |
|---|---|---|---|
| A:invalid data | A:invalid data | A:invalid data | A:invalid data |
| B:invalid data | C:invalid data | B:invalid data | B:invalid data |
| C:invalid data | A:invalid data | C:invalid data | A:invalid data |
| A:invalid data | B:invalid data | A:invalid data | B:invalid data |
| B:invalid data | A:invalid data | A:invalid data | C:invalid data | block BLK2 (free block by GC operation) (block-erased)

| | | | |
|---|---|---|---|
| A:invalid data | A:invalid data | A:invalid data | B:invalid data |
| A:invalid data | A:invalid data | B:invalid data | B:invalid data |
| B:invalid data | A:invalid data | A:invalid data | A:invalid data |
| A:invalid data | B:invalid data | A:invalid data | B:invalid data |
| B:invalid data | A:invalid data | A:invalid data | A:invalid data | block BLK3 (free block before GC operation)
(not block-erased since data of namespace B are not stored)

| | | | |
|---|---|---|---|
| A:invalid data | A:invalid data | A:invalid data | C:invalid data |
| A:invalid data | A:invalid data | C:invalid data | A:invalid data |
| A:invalid data | A:invalid data | A:invalid data | C:invalid data |
| C:invalid data | A:invalid data | A:invalid data | C:invalid data |
| A:invalid data | C:invalid data | A:invalid data | A:invalid data | block BLK4 (free block before GC operation)
(block-erased since data of namespace B are stored)

| | | | |
|---|---|---|---|
| B:invalid data | B:invalid data | A:invalid data | C:invalid data |
| A:invalid data | A:invalid data | C:invalid data | A:invalid data |
| A:invalid data | A:invalid data | A:invalid data | C:invalid data |
| C:invalid data | A:invalid data | A:invalid data | C:invalid data |
| A:invalid data | C:invalid data | A:invalid data | A:invalid data |

F I G. 12B

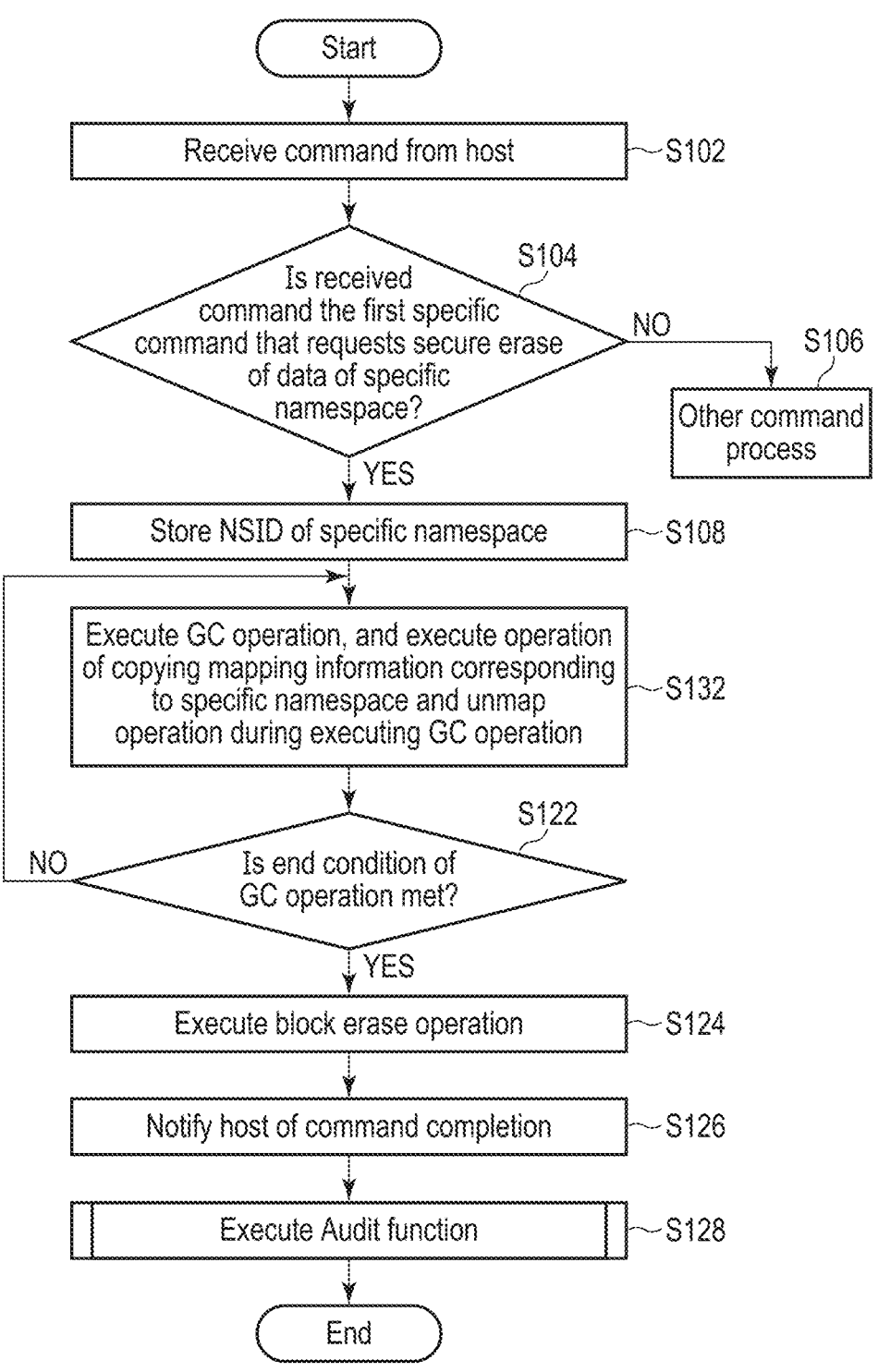
F I G. 13

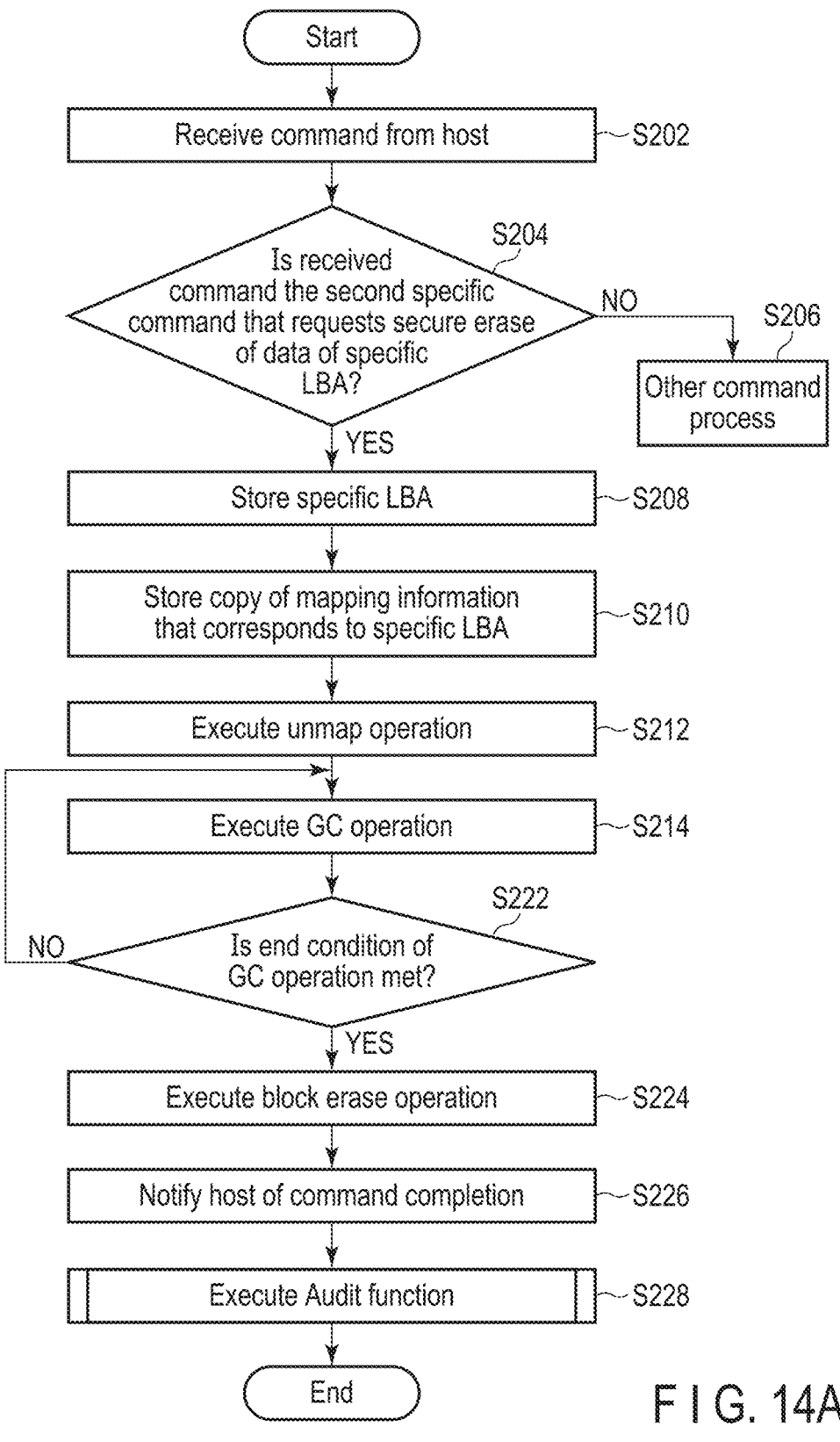
F I G. 14A

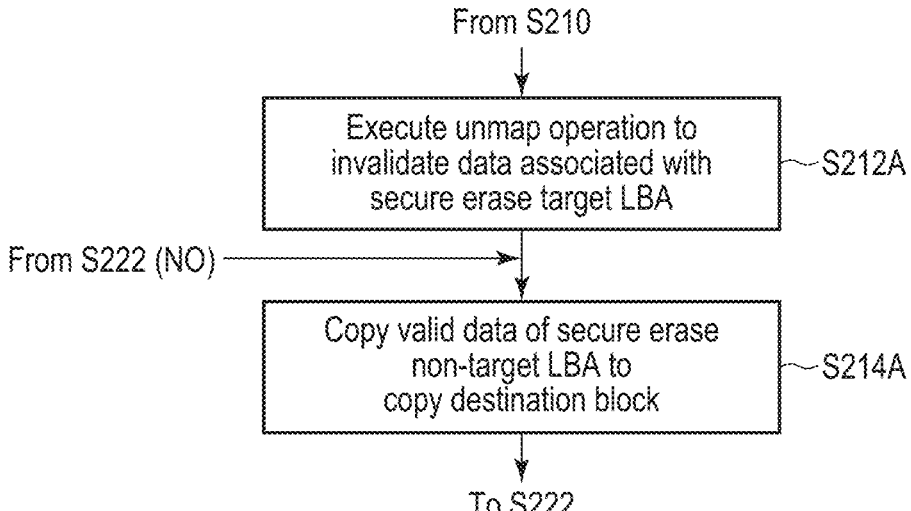
F I G. 14B

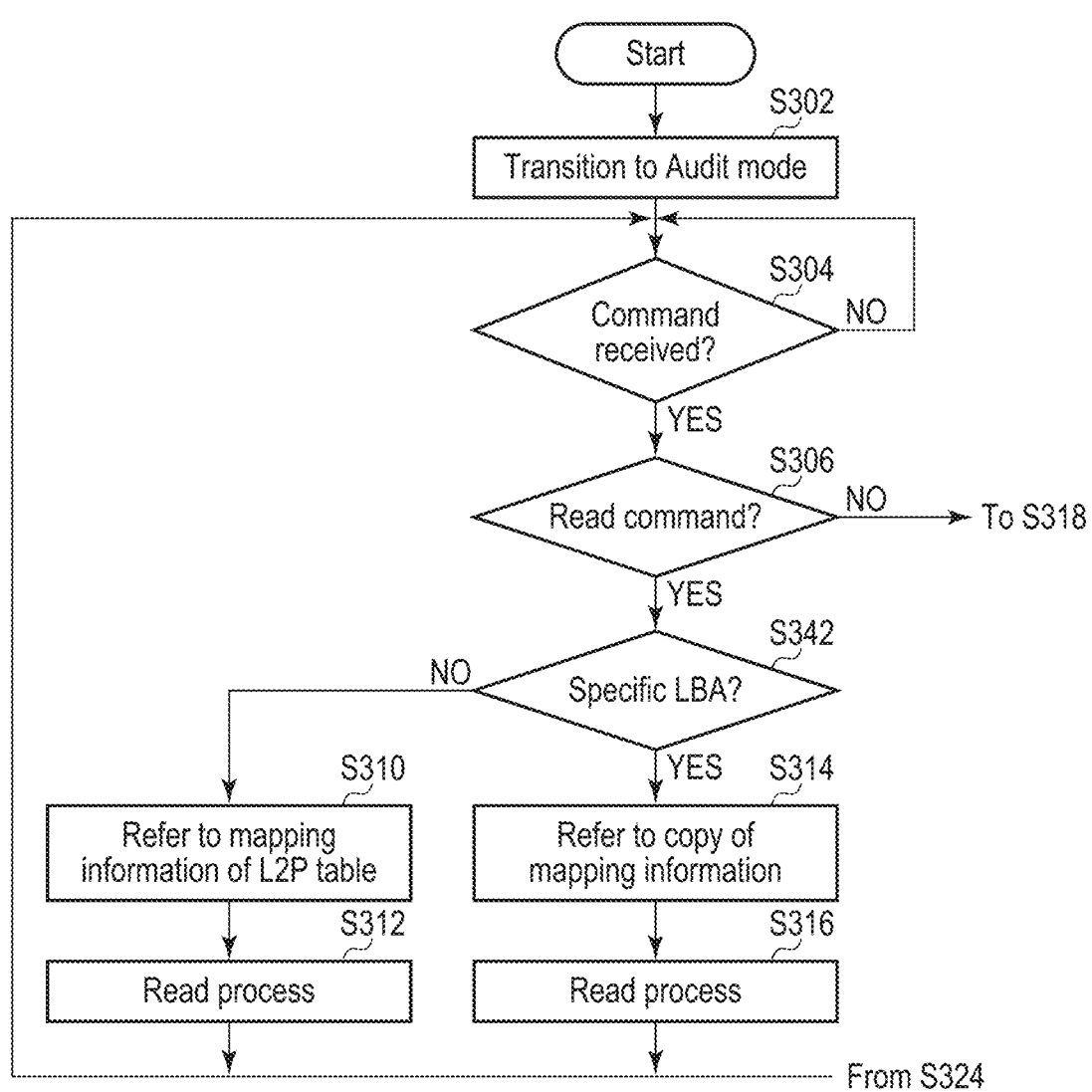
F I G. 15A

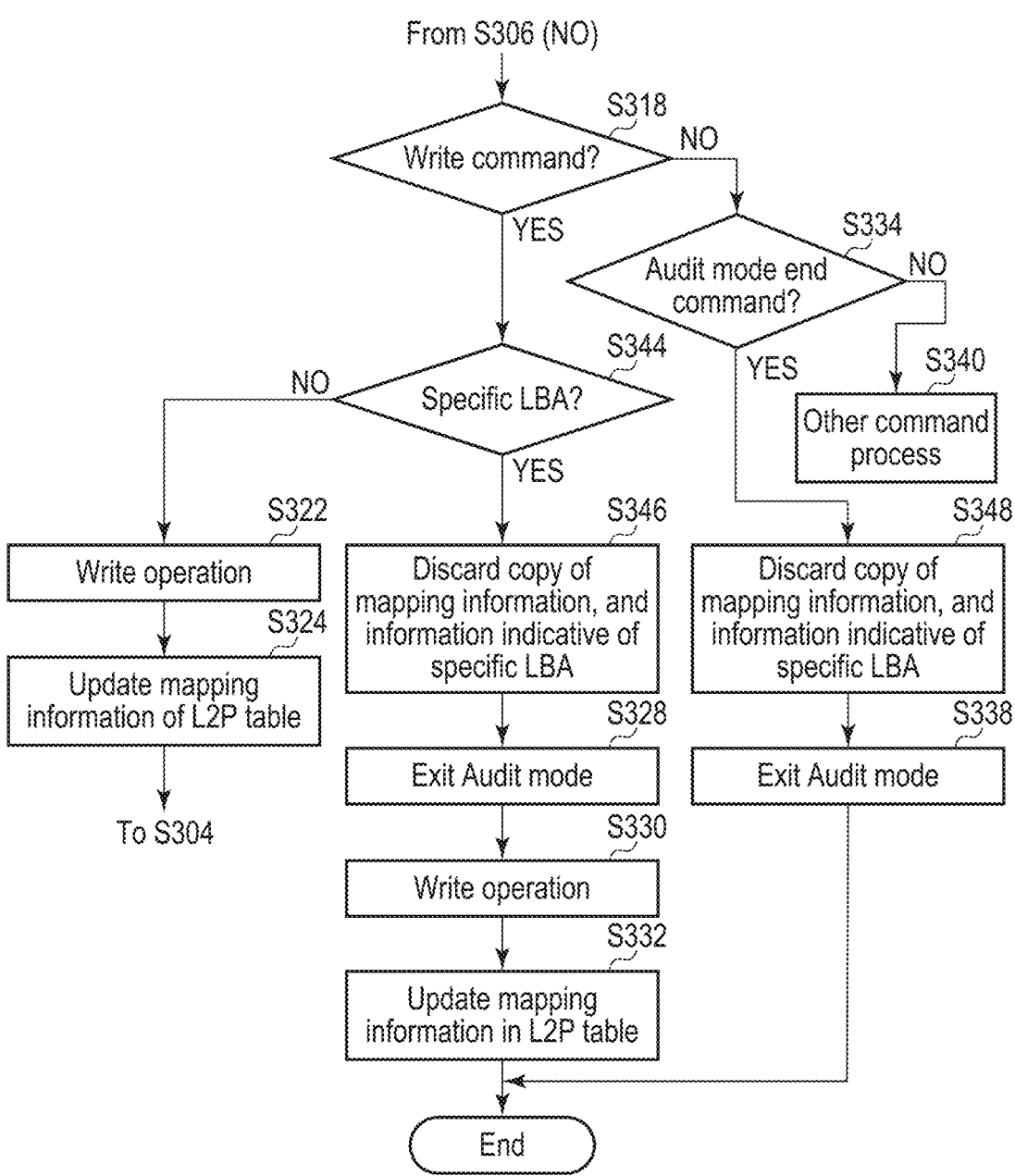
F I G. 15B

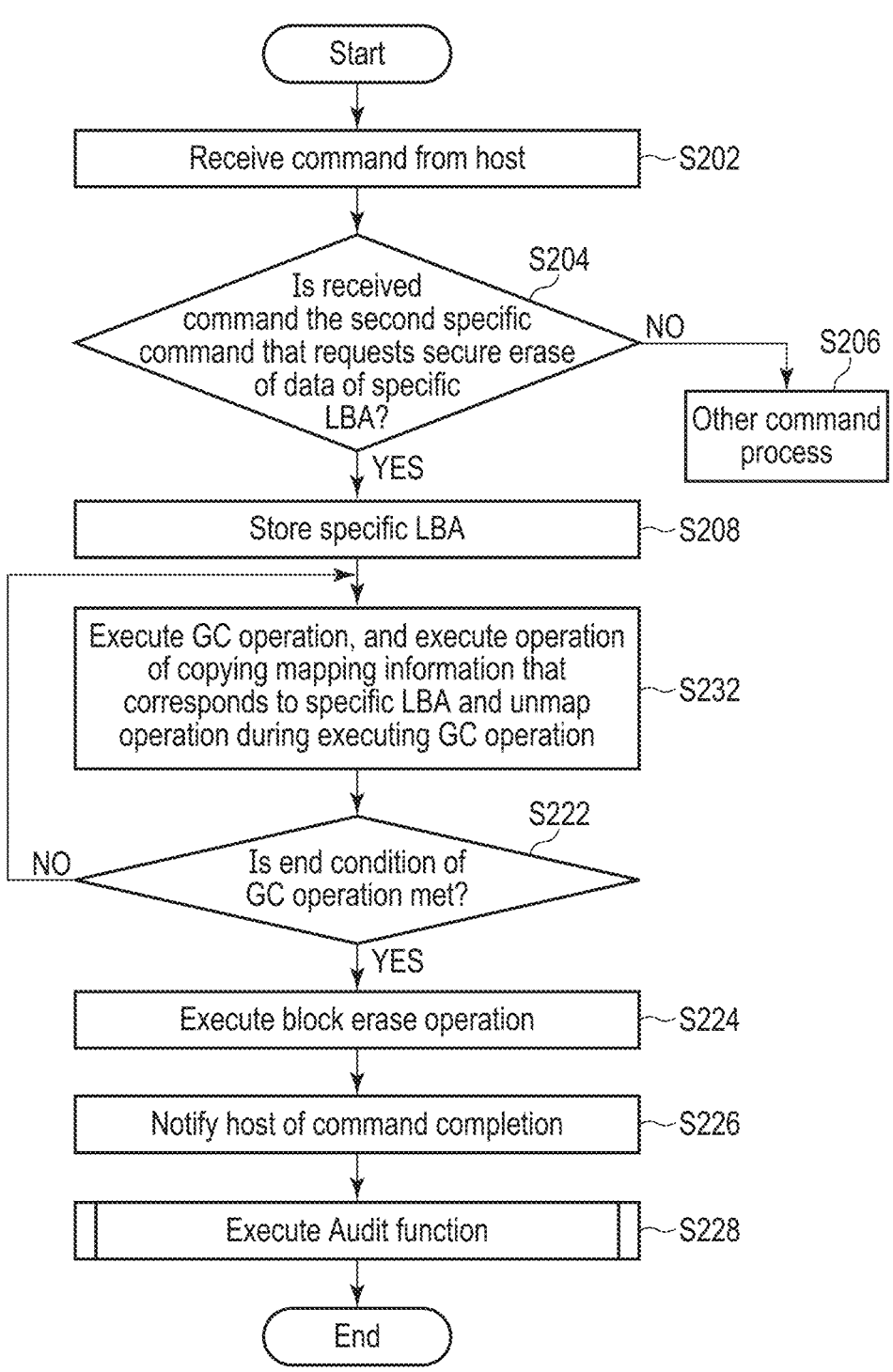
F I G. 16A

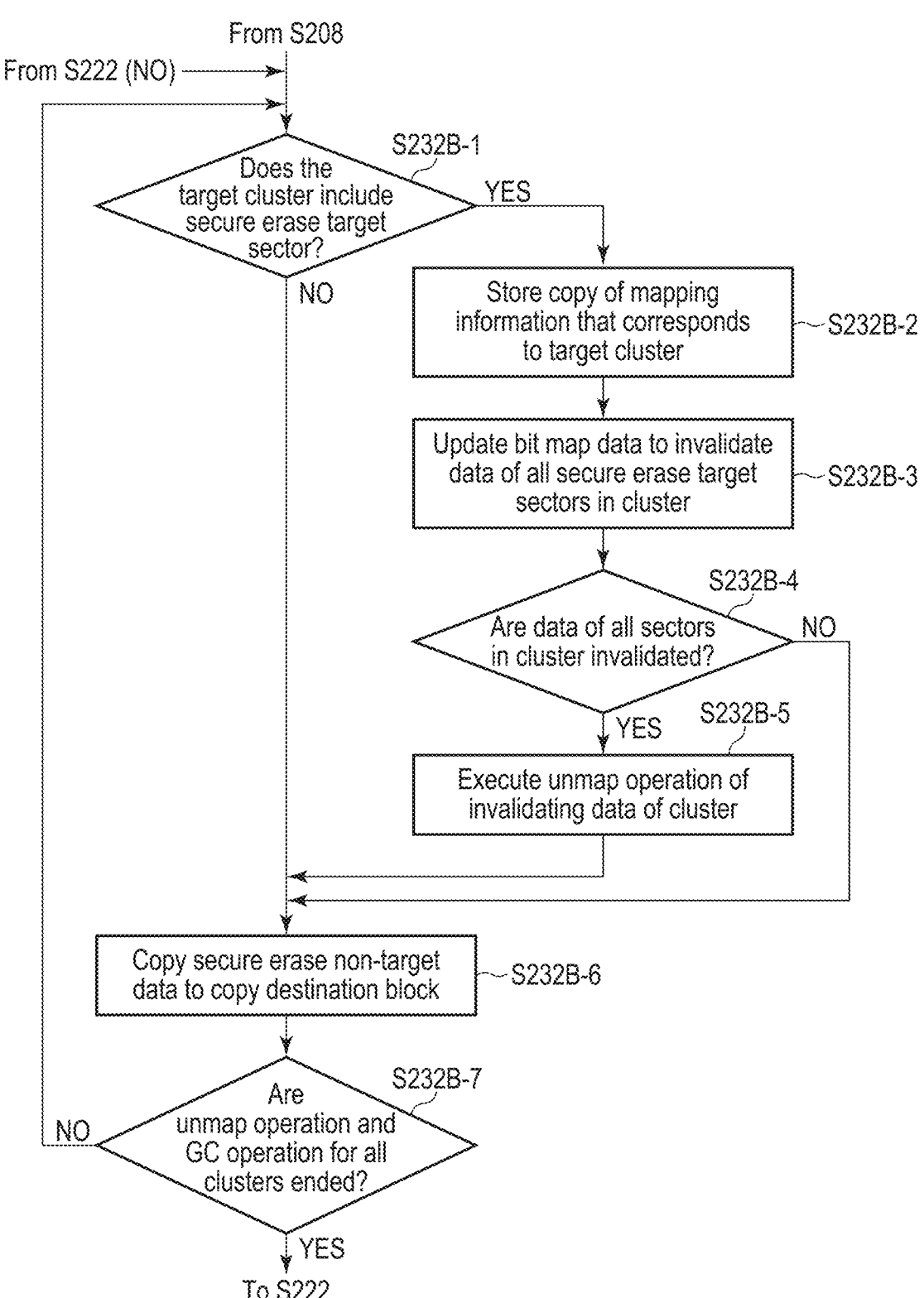
F I G. 16C

MEMORY SYSTEM

CROSS-REFERENCE TO RELATED APPLICATIONS

This application is based upon and claims the benefit of priority from Japanese Patent Application No. 2023-036753, filed Mar. 9, 2023, the entire contents of which are incorporated herein by reference.

FIELD

Embodiments described herein relate generally to a technique of controlling a nonvolatile memory.

BACKGROUND

In recent years, memory systems that includes a nonvolatile memory have are become widely used. One of these memory systems is known as a solid state drive (SSD) that includes a NAND flash memory.

As secure erase methods for erasing the data stored in an SSD securely and reliably, overwrite, block erase, and cryptographic erase are known. The secure erase methods are classified into a physical secure erase method, which makes the stored data physically and irreversibly unreadable, and a logical secure erase method, which makes the stored data logically unreadable. Each of overwrite and block erase is an example of the physical secure erase method. Cryptographic erase is an example of the logical secure erase method.

In cryptographic erase, the cryptographic key used when data stored in the SSD is encrypted is erased by the physical secure erase method. As a result, the data cannot be decrypted and is logically erased.

Recently, there is a demand to execute secure erase, by the physical secure erase method, of certain data stored in the memory system such as an SSD.

Furthermore, there is also a demand to confirm whether or not the secure erase of specific data is correctly executed.

An embodiment described herein aims to provide a memory system capable of executing secure erase of specific data by a physical secure erase method and confirming whether or not the secure erase of the specific data is correctly executed.

BRIEF DESCRIPTION OF THE DRAWINGS

FIG. 1 is a block diagram illustrating an example of a configuration of an information processing system that includes a memory system according to a first embodiment.

FIG. 3 illustrates an example of a plurality of namespaces managed in the memory system according to the first embodiment.

FIG. 4 illustrates an overview of a write operation and a physical secure erase operation executed in the memory system according to the first embodiment.

FIG. 5 is a flowchart illustrating a procedure of the physical secure erase operation executed in the memory system according to the first embodiment.

FIG. 6 illustrates an example of a data structure written to each blocks in the memory system according to the first embodiment.

FIG. 7A is a flowchart illustrating a part of the procedure of a process related to an Audit function executed in the memory system according to the first embodiment.

FIG. 10A illustrates an example of contents of each active block before starting of the physical secure erase operation, in the memory system according to the first embodiment.

FIG. 10B illustrates another example of contents of each free block before starting of the physical secure erase operation, in the memory system according to the first embodiment.

FIG. 11 illustrates an example of contents of each active block after an unmap operation was executed, in the memory system according to the first embodiment.

FIG. 12A illustrates an example of contents of each active block after a garbage collection operation was executed, in the memory system according to the first embodiment.

FIG. 12B illustrates another example of contents of each free block after the garbage collection operation was executed, in the memory system according to the first embodiment.

FIG. 13 is a flowchart illustrating a procedure of a physical secure erase operation executed in a memory system according to a second embodiment.

FIG. 14A is a flowchart illustrating a procedure of a physical secure erase operation executed in a memory system according to a third embodiment.

FIG. 14B is a flowchart illustrating a procedure of an unmap operation and a garbage collection operation executed in the memory system according to the third embodiment.

FIG. 15A is a flowchart illustrating a part of procedure of a process related to an Audit function executed in the memory system according to the third embodiment.

FIG. 15B is a flowchart illustrating a remaining procedure of the process related to the Audit function executed in the memory system according to the third embodiment.

FIG. 16A is a flowchart illustrating a procedure of a physical secure erase operation executed in a memory system according to a fourth embodiment.

FIG. 16C is a flowchart illustrating another procedure of the unmap operation and the garbage collection operation executed in the memory system according to the fourth embodiment.

DETAILED DESCRIPTION

Figure 2:
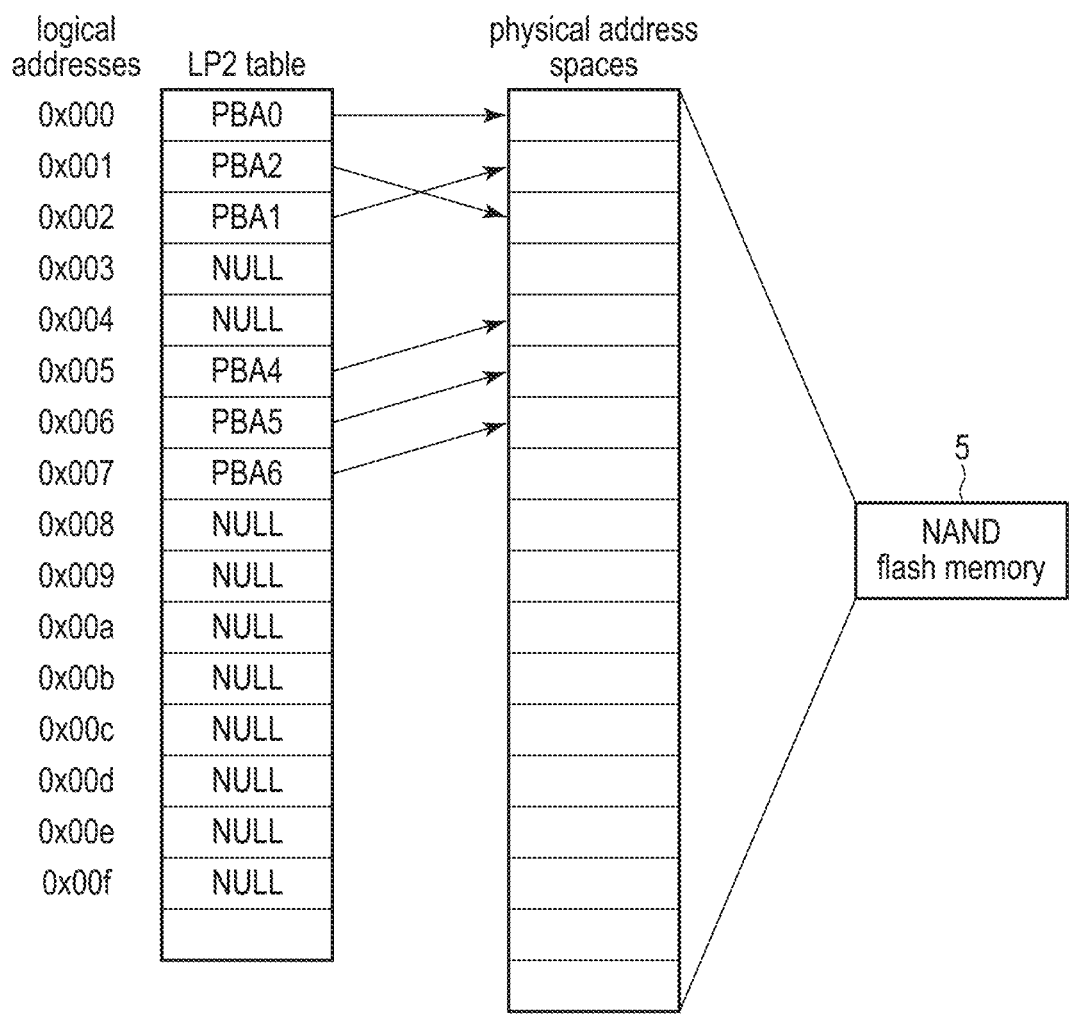
FIG. 2 illustrates an example of a configuration of a logical-to-physical address translation table (L2P table) used in the memory system according to the first embodiment.

Embodiments will be described hereinafter with reference to the accompanying drawings.

In general, according to one embodiment, a memory system is connectable to a host. The memory system comprises a nonvolatile memory and a controller electrically connected to the nonvolatile memory. The nonvolatile memory includes a plurality of blocks, each of the plurality of blocks being a unit of a data erase operation. The controller is configured to manage a first table storing mapping information that indicates mapping between each of one or more logical area identifiers and each of one or more physical addresses of the nonvolatile memory, the mapping information including at least first mapping information. The controller is configured to: in response to receiving, from the host, a first command that requests secure erase of secure erase target data associated with a first logical area identifier, store a copy of the first mapping information that corresponds to the first logical area identifier; specify one or more first blocks among the plurality of blocks, the one or more first blocks storing the secure erase target data associated with the first logical area identifier; execute at least the data erase operation for the one or more first blocks; and transition to a first mode after executing the data erase operation for the one or more first blocks. The controller is configured to: in the first mode, in response to receiving, from the host, a read command that specifies the first logical area identifier, read data from a storage location in the nonvolatile memory corresponding to a first physical address, the first physical address being mapped to the first logical area identifier in the copy of the first mapping information.

First Embodiment

A configuration of an information processing system that includes a memory system according to a first embodiment will be described. FIG. 1 is a block diagram illustrating an example of a configuration of an information processing system 1 that includes the memory system according to the first embodiment.

The information processing system 1 includes a host (host device) 2, and a memory system 3. The host 2 is an information processing device that is configured to control the memory system 3. Examples of the host 2 include a personal computer, a server computer, a portable terminal, or an in-vehicle device. The memory system 3 is a semiconductor storage device configured to write data to a nonvolatile memory and to read data from the nonvolatile memory. The memory system 3 may be realized as, for example, a solid state drive (SSD) or a universal flash storage (UFS) device. An example that the memory system 3 is realized as an SSD will be described below. In the following descriptions, the memory system 3 is referred to as an SSD 3.

The SSD 3 may be connected to the host 2 via a cable or a network. Alternatively, the SSD 3 may be built in the host 2.

The interface for connecting the host 2 with the SSD 3 is not limited, but may be Serial ATA (SATA), Serial Attached SCSI (SAS), M-PHY, PCI Express (PCIe) (registered trademark), or Ethernet (registered trademark).

The SSD 3 comprises a controller 4 and a nonvolatile memory 5. The nonvolatile memory 5 is, for example, a NAND flash memory. The nonvolatile memory 5 is referred to as a NAND flash memory 5 in the following descriptions. The SSD 3 may also comprise a random access memory 6. The random access memory 6 is, for example, a dynamic random access memory (DRAM). The random access memory 6 is referred to as a DRAM 6 in the following descriptions.

The NAND flash memory 5 includes a memory cell array that includes a plurality of memory cells arrayed in matrix. The NAND flash memory 5 may be a flash memory having a two-dimensional structure or a flash memory having a three-dimensional structure.

The memory cell array of the NAND flash memory 5 includes a plurality of blocks BLK0 to BLKx−1. Each of the blocks BLK0 to BLKx−1 includes a plurality of pages (in this example, pages P0 to Py−1). Each of the pages includes a plurality of memory cells connected to the same word line. Each of the blocks BLK0 to BLKx−1 is a unit of a data erase operation (hereafter also referred to as block erase) that erases data in the NAND flash memory 5. The blocks may also be referred to as erase blocks, physical blocks or physical erase blocks. Each of the pages P0 to Py−1 is a unit of a data write operation and a data read operation. Initial data (for example, all 1 data) may be read from a block in an erased state (i.e., a block where a data erase operation has been executed and a data write operation has not yet been executed).

The controller 4 may be a circuit such as a system-on-a-chip (SoC). The controller 4 is not limited, but is electrically connected to the NAND flash memory 5 via a NAND interface 13 conforming to Toggle NAND flash interface or Open NAND Flash Interface (ONFI). The controller 4 operates as a memory controller configured to control the NAND flash memory 5.

The controller 4 can function as a flash translation layer (FTL) configured to execute data management and block management of the NAND flash memory 5.

The data management executed by the FTL includes (1) management of mapping information indicating mapping between each of a plurality of logical area identifiers each specifying a plurality of logical areas, and each of one or more physical addresses of the NAND flash memory 5, and (2) a process of concealing constraints of the NAND flash memory 5 (for example, data write/data read operations in page units and a data erase operation in block units).

The logical area identifier may be a namespace identifier, a logical address, or a combination of a namespace identifier and a logical address. Alternatively, the logical area identifier may be a key of a key-value store.

The logical address is an address used by the host 2 to specify a logical address in the logical address space of the SSD 3. A logical block address (LBA) may be used as the logical address.

The controller 4 is configured to create and manage a plurality of namespaces. The plurality of namespaces are logical address ranges that are independent of each other. The plurality of namespaces are used to make a memory system operate as if it is a plurality of memory systems. The plurality of namespaces are used by the host 2 to access the SSD 3. The namespace identifier is an identifier used by the host 2 to specify a namespace.

The management of the mapping information is executed using an address translation table (logical-to-physical address translation table: L2P table) 37, which is a table storing the mapping information. The L2P table 37 is also referred to as a mapping table. Each of the physical addresses mapped to a logical area identifier that indicates a certain logical area indicates the latest physical storage location in the NAND flash memory 5 where the data associated with this logical area identifier is written. The L2P table 37 may be loaded from the NAND flash memory 5 into the DRAM 6 at power-on of the SSD 3.

When a logical address (for example, LBA) is used as the logical area identifier, the mapping information stored in the L2P table 37 is information that indicates mapping between each LBA and each physical block address (PBA) in a unit of a predetermined management size, which is referred to as a cluster. For example, a cluster has a size that is an integer multiple of the size of a sector (also referred to as a logical block) specified by an LBA. An example of the sector size is 512 B or 4 KiB, and an example of the cluster size is 4 KiB. Note that the size of the cluster may be larger than 4 KiB. When the size of the sector specified by the LBA is smaller than the size of the cluster, bitmap data indicating whether data in each of the plurality of sectors included in each cluster is valid data or invalid data may be stored in the L2P table 37.

When a key of the key-value store is used as the logical area identifier, the mapping information stored in the L2P table 37 is not limited, but is information indicating, for example, correspondence among a hash value for each key, a pointer to each key, a unique number corresponding to each key, the size of a value corresponding to each key, and a physical address list including one or more physical addresses where the value corresponding to each key is stored.

FIG. 2 illustrates an example of a configuration of the L2P table 37. An example of a configuration of the L2P table 37 in a case where logical addresses such as LBAs are used as the logical area identifiers will be described.

In the L2P table 37, a physical address corresponding to a certain logical address indicates the latest physical storage location in the NAND flash memory 5 to which data associated with this logical address is written.

The L2P table 37 includes a plurality of entries corresponding to a plurality of logical addresses, respectively. The physical address PBA mapped to a certain logical address is stored in the entry corresponding to this logical address. For example, when the controller 4 writes data associated with a certain logical address to a certain physical storage location in the NAND flash memory 5, the controller 4 updates the L2P table 37 to map the physical address PBA indicating this physical storage location to this logical address.

FIG. 2 shows an example of a case where physical addresses PBA0, PBA2, PBA1, PBA4, PBA5, and PBA6 are mapped to logical addresses 0x000, 0x001, 0x002, 0x005, 0x006, and 0x007, respectively. When data associated with a certain logical address is not written to the NAND flash memory 5, a predetermined constant (for example, a NULL value) may be stored in the entry corresponding to this logical address.

The descriptions return to those of FIG. 1. In the NAND flash memory 5, a data write operation on a page can be executed only once per data erase operation to the block in which the page is included. In other words, new data cannot be written directly to an area in a block in which data is already written. For this reason, when updating the already written data, the controller 4 writes new data to an unwritten area in the block (or in the other block), and regards the previous data as invalid data. In other words, when data associated with a certain logical area identifier is updated, the controller 4 writes the updated data not to the physical storage location where the previous data is stored, but to a different physical storage location. Then, the controller 4 updates the L2P table 37 to map the physical address indicating this physical storage location to this logical area identifier, and invalidates the previous data.

Block management executed by the FTL includes bad block (defective block) management, wear leveling, and garbage collection.

The wear leveling is an operation of uniforming the number of times of rewriting each block (i.e., the number of program/erase cycles).

The garbage collection is an operation to reduce the number of blocks in which valid data and invalid data exist together and to increase the number of free blocks. The free block indicates a block that stores no valid data.

The valid data is the latest data associated with a logical area identifier indicating a certain logical area. For example, data stored in a physical storage location referenced by the mapping information stored in the L2P table 37 (i.e., data managed to be associated with a logical area identifier as the latest data by the controller 4) is valid data. In other words, the valid data is data which may be read later by the host 2.

The invalid data is data stored in a physical storage location which is not referenced by the mapping information stored in the L2P table 37. For example, data stored in a physical storage location indicated by a physical address that is not mapped to any logical area identifiers (i.e., data which is not managed to be associated with a logical area identifier as the latest data by the controller 4) is invalid data. The invalid data is data which no longer has a possibility of being read by the host 2. When data associated with a logical area identifier indicating a certain logical area is updated, the valid data previously associated with this logical area identifier becomes invalid data and the updated data becomes new valid data. In addition, when an unmap operation to be described later is executed for a logical area identifier indicating a certain logical area, the valid data which is previously associated with this logical area identifier also becomes invalid data.

In the garbage collection, the controller 4 selects and copies only valid data in several blocks where the valid data and invalid data exist together to another block (for example, a free block). The controller 4 updates the L2P table 37 and maps the copy destination physical address to the logical area identifier with which the copied valid data is associated. A block including only invalid data by copying the valid data to another block is released as a free block. This block can be thereby reused to write data after a data erase operation on this block.

The controller 4 includes a host interface (I/F) 11, a CPU 12, a DRAM interface (I/F) 14, a direct memory access controller (DMAC) 15, a static RAM (SRAM) 16, and an error correction code (ECC) encode/decode unit 17, in addition to the above-described NAND interface (I/F) 13. The host I/F 11, the CPU 12, the NAND I/F 13, the DRAM I/F 14, the DMAC 15, the SRAM 16, and the ECC encode/decode unit 17 are interconnected via a bus 10.

The host I/F 11 is a host interface circuit configured to execute communication with the host 2. The host I/F 11 may be, for example, a SATA interface controller, a SAS interface controller, a PCIe controller, or an Ethernet controller.

The host I/F 11 receives various commands from the host 2. ATA commands defined under the ATA standard are used in the SATA interface. SCSI commands defined under the SCSI standard are used in the SAS interface. NVMe commands defined under NVM Express (NVMe) (registered trademark) standard are used in the PCIe interface and the Ethernet interface. These commands include a write command, a read command, an unmap command, and the like.

The write command (write request) is a command which requests the SSD 3 to write user data (write data) associated with a logical area identifier indicating a certain logical area to the NAND flash memory 5. The write command in a case where a combination of a logical address (especially, LBA) and a namespace identifier is used as a logical area identifier may include, for example, a namespace identifier that identifies a certain namespace, a logical address (starting LBA) in this namespace, the size of the write data (the number of sectors), and a data pointer (buffer address) indicating a location in a memory of the host 2 where the write data is stored. The starting LBA indicates the first sector associated with the write data.

The read command (read request) is a command which requests the SSD 3 to read from the NAND flash memory 5 data associated with a logical area identifier indicating a logical area specified by this read command. The read command in a case where a combination of a logical address (especially, LBA) and a namespace identifier is used as a logical area identifier may include a namespace identifier that identifies a certain namespace, a logical address (starting LBA) in this namespace, the size of the data (the number of sectors) to be read, and a data pointer (buffer address) indicating a location in the memory of the host 2 to which the read data is to be transferred. The starting LBA indicates the first sector associated with the data to be read.

The unmap command is a command which requests the SSD 3 to invalidate data associated with a logical area identifier specified by this unmap command. When a combination of a logical address (especially, LBA) and a namespace identifier is used as a logical area identifier, the controller 4 deletes the physical address in each of the entries in the L2P table 37 corresponding to the logical address range (LBA range) specified by the unmap command. In this case, the controller 4 may delete the physical address in each of these entries by overwriting a NULL value to these entries. The data associated with each logical address included in this logical address range becomes invalid data, by this unmap operation.

A command which requests the SSD 3 to execute secure erase for data associated with a logical area identifier indicating a specific logical area (hereinafter referred to as a specific command) is also included in the commands received from the host 2. In the following description, the specific logical area is referred to as a secure erase target logical area. An identifier indicating the secure erase target logical area is referred to as a secure erase target logical area identifier. In addition, data associated with the secure erase target logical area identifier is referred to as secure erase target data. The secure erase target logical area is a logical area identified by the logical area identifier (secure erase target logical area identifier) specified by the specific command.

The secure erase target data includes both the data currently associated with the secure erase target logical area identifier and data previously associated with this secure erase target logical area identifier. The data currently associated with the secure erase target logical area identifier is the valid data currently associated with the secure erase target logical area identifier. The data previously associated with the secure erase target logical area identifier is invalid data that has been invalidated by, for example, updating data associated with this logical area identifier. In the SSD 3, since the updated data is written to a physical memory location different from the physical memory location where the old data is stored, the data is updated while the old data remains as invalid data in the old physical memory location. The secure erase target data also includes such invalid data.

The specific command is, for example, a command that specifies a logical area identifier for identifying the secure erase target logical area and requests secure erase of the secure erase target data.

Alternatively, the specific command may be a command that requests secure erase of the secure erase target data without specifying a logical area identifier for identifying the secure erase target logical area. In this case, the host 2 first transmits one or more commands specifying the logical area identifier that identifies the secure erase target logical area to the SSD 3. Next, the host 2 transmits a specific command requesting secure erase of the secure erase target data to the SSD 3.

When the logical area identifier identifying the secure erase target logical area is a namespace identifier, the secure erase target logical area is a namespace identified by the namespace identifier. In this case, the secure erase target data includes both the data currently associated with the namespace identified by the namespace identifier and data previously associated with this namespace.

Thus, in a case where the controller 4 is configured to manage a plurality of namespaces each identified by a plurality of namespace identifiers, the namespace identifier may be used as a logical area identifier that identifies a secure erase target namespace.

When the logical area identifier that identifies the secure erase target logical area is a logical address such as an LBA, the secure erase target logical area is a sector identified by the logical address. In this case, the secure erase target data includes both the data currently associated with the logical address indicating this sector and data previously associated with this logical address. Note that when the controller 4 manages a plurality of namespaces, a combination of a namespace identifier and a logical address may be used as a logical area identifier that identifies the secure erase target logical area.

The specific command can specify one or more logical addresses that identify one or more secure erase target sectors. In this case, the specific command may specify a logical address range. The logical address range is specified by, for example, a logical address indicating a starting part of the secure erase target logical area and the number of sectors from this address. When a plurality of logical address ranges are to be secure-erased, the host 2 may first transmit to the SSD 3 a plurality of commands each specifying the secure erase target logical address range, and then transmit to the SSD 3 a specific command to request secure erase of the secure erase target data associated with the secure erase target logical address ranges. Of course, the specific command may include a plurality of parameters specifying a plurality of logical address ranges. In this case as well, when the controller 4 manages a plurality of namespaces, a combination of a namespace identifier and a logical address range may be used as a logical area identifier that identifies the secure erase target logical area.

When the controller 4 supports the key-value stores, a key of the key-value store may be used as a logical area identifier that identifies the secure erase target logical area. In this case, the secure erase target logical area is a logical area identified by the key. The secure erase target data includes both the data currently associated with the key indicating this logical area and data previously associated with this key. The specific command may specify one or more keys that identify one or more secure erase target logical areas.

In the first embodiment, a combination of a namespace identifier and a logical address (LBA) is used as the logical area identifier specified by I/O commands such as a write command and a read command. The combination of the namespace identifier and the logical address (LBA) specified by the I/O commands indicates an access target logical area. Note that, when the controller 4 supports the key-value store, a key of the key-value store or a combination of a namespace identifier and a key indicates an access target logical area.

The specific command may be a command to request the execution of the secure erase operation with an Audit function. The Audit function is a function to enable the host 2 to confirm whether or not data associated with a logical area identifier specified by the specific command has been secure-erased (physically secure-erased or logically secure-erased) by the NAND flash memory 5. A case where the command to request the execution of the secure erase operation with the Audit function is used as the specific command will be described below. Details of the Audit function will be described below.

FIG. 3 illustrates a plurality of namespaces managed in the SSD 3.

A case where the controller 4 manages namespace NS #1, namespace NS #2, and namespace NS #3 is illustrated in FIG. 3. Each of the namespaces is identified by a namespace identifier (NSID). Each of the namespaces includes a set of a plurality of contiguous logical addresses (LBAs). The logical address range corresponding to each of the namespaces starts from LBA0. Each namespace may be set to any size. The size of each namespace corresponds to the number of LBAs that are included in each namespace.

In FIG. 3, namespace NS #1 includes a plurality of contiguous LBAs from LBA0 to LBA (i–1), namespace NS #2 includes a plurality of contiguous LBAs from LBA0 to LBA (j–1), and namespace NS #3 includes a plurality of contiguous LBAs from LBA0 to LBA (k–1).

When a plurality of namespaces are managed by the controller 4, each logical address in one internal logical address space of the SSD 3 (internal logical address inLBA) and each physical address of the NAND flash memory 5 may be mapped using a single L2P table 37. For example, the controller 4 may convert the LBA range of namespace NS #1 (LBA0 to LBA(i–1)) into an internal logical address range from inLBA0 to inLBA (i–1), convert the LBA range of namespace NS #2 (LBA0 to LBA ((j–1)) into an internal logical address range from inLBAi to inLBA(i+j–1), and convert the LBA range of namespace NS #3 (LBA0 to LBA(k–1)) into an internal logical address range from inLBA (i+j) to inLBA (i+j+k–1). Then, the controller 4 manages mapping between each physical address and each internal logical address in the internal logical address range from inLBA0 to inLBA (i+j+k–1), using the single L2P table 37.

Alternatively, the L2P table 37 may be created for each namespace.

The descriptions return to those of FIG. 1. The CPU 12 is a processor that is configured to control the host I/F 11, the NAND I/F 13, the DRAM I/F 14, the DMAC 15, the SRAM 16, and the ECC encode/decode unit 17. The CPU 12 loads a control program (firmware) from the NAND flash memory 5 or a ROM (not shown) onto the SRAM 16 in response to power-on of the SSD 3, and performs various processes by executing the firmware. Note that the firmware may also be loaded into the DRAM 6. The CPU 12 can execute command processes for processing various commands from the host 2, and the like. The operations of the CPU 12 are controlled by the above-described firmware. Note that a part or all parts of the command processing may be executed by dedicated hardware in the controller 4.

The firmware causes the CPU 12 to function as a namespace management unit 21, a write control unit 22, a read control unit 23, and an erase control unit 24.

The namespace management unit 21 creates, manages, and deletes namespaces, based on namespace management commands received from the host 2.

The write control unit 22 processes a write command received from the host 2 via the host I/F 11. The write command specifies a logical area identifier (for example, the namespace identifier (NSID) or the start LBA), the size of write data, and the like. The write control unit 22 writes the write data associated with the write command received from the host 2 via the host I/F 11 to the NAND flash memory 5 via the NAND I/F 13. Then, the write control unit 22 updates the L2P table 37 such that each LBA associated with the write data and the physical address to which this write data is written are mapped.

The write control unit 22 may write the logical area identifier (for example, LBA) associated with this write data to the NAND flash memory 5 together with the write data. In this case, the logical area identifier may be written to the same block as a block to which this data is written. In particular, the logical area identifier may be written to the same page as a page to which this data is written.

The read control unit 23 processes a read command received from the host 2 via the host I/F 11. The read command specifies a logical area identifier (for example, the namespace identifier (NSID) or the start LBA), the size of read target data, and the like. The read control unit 23 obtains a physical address where the read target data is stored, by referring to the L2P table 37. Then, the read control unit 23 reads the read target data from the NAND flash memory 5 via the NAND I/F 13.

When a logical area identifier associated with write data has been written to the NAND flash memory 5 together with the write data, the read control unit 23 may read the logical area identifier associated with this read target data from the NAND flash memory 5 together with the read target data. If the logical area identifier specified by the read command does not match the logical area identifier read from the NAND flash memory 5, the read control unit 23 may also determine that the read target data is incorrect data.

The erase control unit 24 executes secure erase for secure erase target data associated with a secure erase target logical area identifier, by a physical secure erase method, in response to a specific command received from the host 2 via the host I/F 11. After executing the secure erase operation, the erase control unit 24 transitions to an Audit mode. The Audit mode is an operation mode of executing the Audit function for a read command that requests reading data associated with the secure erase target logical area identifier. The erase control unit 24 includes a mapping information copy unit 241, an unmap unit 242, a garbage collection (GC) unit 243, a secure erase unit 244, and an Audit function execution unit 245, to execute the secure erase operation with the Audit function.

The mapping information copy unit 241 stores a copy of the mapping information that corresponds to a secure erase target logical area among the mapping information included in the L2P table 37. The copy of the mapping information is backup information indicating the mapping information that corresponds to the secure erase target logical area immediately before the secure erase operation for the secure erase target logical area is started. The mapping information copy unit 241 stores the copy of the mapping information that corresponds to the secure erase target logical area, by copying the mapping information corresponding to the secure erase target logical area from the L2P table 37 to the NAND flash memory 5 or a volatile memory in the SSD 3 (for example, the SRAM 16 or the DRAM 6). The copy of the mapping information remains unchanged and maintains the contents at the time of the copying, even if the mapping information in the L2P table 37 is changed after the copying, by each of the unmap operation and the garbage collection operation.

The unmap unit 242 executes the unmap operation to invalidate the secure erase target data. For example, the unmap unit 242 deletes all physical addresses currently mapped to the secure erase target logical area identifier in the L2P table 37, thereby invalidating the secure erase target data.

The GC unit 243 selects each block that stores the secure erase target data, and valid data among the data excluding the secure erase target data, as a GC target block (copy source block). The secure erase target data among the valid data in the copy source block is invalidated by the unmap operation. Therefore, the valid data among the data excluding the secure erase target data is the remaining valid data in the copy source block, i.e., the valid data associated with other logical area identifiers than the secure erase target logical area identifier. The GC unit 243 executes a copy operation to copy only the valid data among the data excluding the secure erase target data, from the copy source block to a copy destination block. The copy source block becomes a free block in which no valid data is stored, by the unmap operation and the copy operation.

After executing the copy operation, the secure erase unit 244 executes the data erase operation for at least all blocks, including the copy source block, that store the secure erase target data. The secure erase unit 244 thereby executes the secure erase for the secure erase target data by a physical secure erase method.

The operation of storing a copy of the mapping information that corresponds to the secure erase target logical area by the mapping information copy unit 241 may be executed before the unmap operation in the secure erase operation is executed or may be executed during the execution of this unmap operation.

In the latter case, when the unmap unit 242 deletes the physical address mapped to the secure erase target logical area identifier (i.e., the physical address to be deleted) in the mapping information in the L2P table 37, the mapping information copy unit 241 may store a copy of a part of mapping information of the L2P table 37 that includes the physical address to be deleted, in the NAND flash memory 5 or the volatile memory in the SSD 3. It will be considered that, for example, the unmap unit 242 invalidates data associated with LBA 100 among the secure erase target logical area identifiers. In this case, when the unmap unit 242 deletes the mapping information including a physical address PBA mapped to the LBA 100 in the mapping information of the L2P table 37, the mapping information copy unit 241 obtains mapping information including this physical address PBA from the L2P table 37 and stores the mapping information in the NAND flash memory 5 or the volatile memory in the SSD 3.

Note that the unmap operation may be executed during the execution of the garbage collection operation. In this case, the mapping information copy unit 241 may store the copy of the mapping information that corresponds to the secure erase target logical area, in a block that became a free block during the execution of the garbage collection operation in the secure erase operation. Thus, the copy of the mapping information that corresponds to the secure erase target logical area can be stored without squeezing the storage area of the volatile memory in the SSD3, even when data of the capacity of the SSD3 is stored in the nonvolatile memory 5.

The Audit function execution unit 245 causes the controller 4 to transition to the Audit mode after executing the secure erase. First, in response to receiving a specific command from the host 2, the Audit function execution unit 245 stores a logical area identifier (also referred to as a first logical area identifier) included in the specific command. For example, the Audit function execution unit 245 stores the first logical area identifier in the SRAM 16 or the DRAM 6. Then, after the secure erase operation is completed, the Audit function execution unit 245 causes the controller 4 to transition to the Audit mode.

In the Audit mode, in response to receiving a read command specifying the first logical area identifier from the host 2, the controller 4 obtains the physical address mapped to the first logical area identifier, which is the secure erase target logical area identifier, not from the L2P table 37, but from the copy of the mapping information. Then, the controller 4 reads data from the physical storage location in the NAND flash memory 5, which corresponds to the obtained physical address, and transmits the read data to the host 2. As described below, the data read from this physical storage location is, for example, initial data, secure erase non-target valid data used for overwriting, data having a specific data pattern, or incorrect data.

In addition, in response to receiving from the host 2 a read command specifying another logical area identifier indicating another logical area other than the first logical area, regardless of whether or not the controller 4 is in the Audit mode, the controller 4 obtains the physical address mapped to the other logical area identifier from the mapping information in the L2P table 37. Then, the controller 4 reads data from the physical storage location in the NAND flash memory 5, which corresponds to the obtained physical address, and transmits the read data to the host 2.

In addition, the Audit function execution unit 245 discards the stored first logical area identifier and the copy of the mapping information, in response to receiving a command requesting the end of the Audit mode or a write command specifying the first logical area identifier from the host 2. Then, the Audit function execution unit 245 causes the controller 4 to exit the Audit mode.

Other components in the controller 4 will be described.

The NAND I/F 13 is a NAND controller configured to control the NAND memory 5 under the control of the CPU 12.

The DRAM I/F 14 is a DRAM controller configured to control the DRAM 6 under the control of the CPU 12.

Several portions of the storage area of the DRAM 6 may be used as a write buffer 31, a read buffer 32, and a command buffer 33. In addition, a part of the storage area of the DRAM 6 may be used as an area where a secure erase target block list 34, a free block list 35, an active block list 36, and an L2P 37 are stored.

The write buffer 31 temporarily stores data to be written to the NAND flash memory 5.

The read buffer 32 temporarily stores data that was read from the NAND flash memory 5.

The command buffer 33 temporarily stores commands received from the host 2 until the commands are executed.

The secure erase target block list 34 stores a block identifier of each block in which the secure erase target data is stored.

The free block list 35 stores a block identifier of each free block. The free block is a block where no valid data is stored.

The active block list 36 stores a block identifier of each active block. The active block is a block where valid data is stored.

The ECC encode/decode unit 17 executes data encoding and decoding processes. For example, the ECC encode/decode unit 17 executes the data encoding process and generates an error correction code in a write operation. The ECC encode/decode unit 17 assigns error correction codes to user data and generates code words that are subject to the write operation. The ECC encode/decode unit 17 executes a decoding process in a read operation. In other words, the ECC encode/decode unit 17 executes error correction of code words read from the NAND flash memory 5 using the error correction codes to recover the user data.

Next, the operation to safely and securely erase data by the physical secure erase method (hereinafter referred to as the physical secure erase operation) will be described.

FIG. 4 illustrates an overview of the write operation and the physical secure erase operation executed in the SSD 3. First, the write operation will be described prior to description of the physical secure erase operation.

The write control unit 22 stores write data in the write buffer 31. When a write destination block 56 is not allocated, the write control unit 22 selects one of the free blocks managed in the free block list 35, executes the block erase for the selected free block, and allocates the free block having subjected to the block erase as the write destination block 56.

The write control unit 22 writes the write data in the write buffer 31 to pages available for writing in the write destination block 56. The write control unit 22 updates the L2P table 37. When the write data is written to the write destination block 56, the write destination block 56 becomes a block to which valid data is partially written (hereinafter also referred to as a partially written block). Since the partially written block stores valid data, the block is managed as an active block.

When there are no more pages available for writing in the write destination block 56 for the reason that the write destination block 56 is filled with the write data, the write control unit 22 allocates a new free block as the write destination block 56, and writes the write data in the write buffer 31 to a writable page of the newly allocated write destination block 56.

Next, the unmap operation and the garbage collection operation, which are executed in the physical secure erase operation, will be described.

When receiving from the host 2 a specific command indicating the secure erase of the data associated with the logical area identifier, the unmap unit 242 executes the unmap operation such that one or more physical addresses mapped to each of all logical area identifiers specified by the specific command are deleted in the mapping information in the L2P table 37. In other words, the unmap unit 242 invalidates the secure erase target data. As a result, all the secure erase target data become invalid data. The active block in which no valid data are stored is removed from the active block list 36 and instead managed in the free block list 35.

Then, the GC unit 243 executes the garbage collection operation. In this garbage collection operation, the GC unit 243 copies only the valid data remaining after invalidating the secure erase target data, from one or more first blocks where the secure erase target data are stored, to one or more copy destination blocks. Since the secure erase target data has been invalidated by the unmap unit 242, the remaining valid data stored in one or more first blocks are the valid data among data associated with logical area identifiers indicating logical areas other than the secure erase target logical area, i.e., the secure erase non-target valid data.

As a result, an active block group does not include the blocks that stores both the secure erase target data and the valid data among the data excluding the secure erase target data. By copying the remaining valid data, one or more first blocks (copy source blocks) no longer store valid data and are handled as free blocks. Therefore, the one or more first blocks are removed from the active block list 36 and instead managed in the free block list 35.

Next, a detailed example of the garbage collection operation executed by the GC unit 243 will be described. The secure erase target data is, for example, any one of (i) data (user data) of a secure erase target namespace identified by a namespace identifier in a case where only the namespace identifier is specified by the specific command, (ii) data of a logical area identified by a namespace identifier and an LBA range in a case where a combination of the namespace identifier and the LBA range is specified by the specific command, and (iii) a value identified by a key in a case where the key of the key-value store is specified by the specific command.

The GC unit 243 selects an active block where the secure erase target data is stored, as a copy source block 52. The active block where the secure erase target data is stored is a block that includes the secure erase target data and the secure erase non-target valid data.

The GC unit 243 selects one free block among the free blocks managed in the free block list 35. The GC unit 243 may preferentially select a free block created during the execution of the garbage collection operation (copy operation) of the GC unit 243. The GC unit 243 executes the block erase for the selected free block. Then, the GC unit 243 allocates the free block for which the block erase has been executed to a copy destination block 54.

The GC unit 243 copies the remaining valid data stored in the copy source block 52, i.e., the secure erase non-target valid data, from the copy source block 52 to the copy destination block 54. The GC unit 243 updates the L2P table 37 and maps the physical address indicating of the copy destination physical storage location to which the valid data is copied, to the logical area identifier of the copied valid data. The secure erase target data in the copy source block 52 is maintained in the unmapped state. The copy destination block 54 to which the valid data has been copied becomes an active block, which is managed in the active block list 36.

When a logical area identifier associated with write data has been written along with the write data to the copy source block 52, the GC unit 243 may read the logical area identifier associated with the copy target valid data along with this data from the copy source block 52 and copy the logical area identifier to the copy destination block 54. The logical area identifier may be copied to the same page as a page to which this data is copied.

When copying all valid data in the copy source block 52 is completed, the copy source block 52 becomes a free block, which is managed in the free block list 35.

The GC unit 243 selects another active block where the secure erase target data is stored, as a new copy source block 52. The GC unit 243 copies the secure erase non-target valid data from the new copy source block 52 to the copy destination block 54. The GC unit 243 updates the L2P table 37 and maps the physical address indicating the copy destination physical storage location to which the valid data is copied, to the logical area identifier of the copied valid data. The secure erase target data in the copy source block 52 is maintained in the unmapped state.

When the copy destination block 54 is filled with data, i.e., when there are no more pages available for writing in the copy destination block 54, the GC unit 243 selects one free block among the free blocks managed in the free block list 35. The GC unit 243 executes the block erase for the selected free block. Then, the GC unit 243 allocates the free block for which the block erase has been executed as a new copy destination block 54.

Since a copy source block from which copying valid data has been completed is managed as a free block in the free block list 35, the copy source block can be reused as the new copy destination block 54. That is, the GC unit 243 may select the copy source block which becomes a free block by copying, as the new copy destination block 54. In this case, the GC unit 243 executes the block erase for the selected block. The secure erase target data in the copy source block which becomes a free block by copying is thereby erased. The GC unit 243 then allocates the block for which the block erase has been executed to the new copy destination block 54. Then, the GC unit 243 copies the secure erase non-target valid data from the copy source block 52 to the new copy destination block 54. Thus, by reusing the copy source block which becomes a free block as the new copy destination block 54, the secure erase target data having been stored in the copy source block is erased by the block erase and is further overwritten by the secure erase non-target valid data.

Thus, the GC unit 243 executes at least the block erase for the copy source block which becomes a free block where no valid data are stored by copying.

When the garbage collection operation for all active blocks that store the secure erase target data is completed, the secure erase target data is no longer present in any block other than the free block.

Next, an example of the above-described block erase operation executed in the physical secure erase operation will be described.

After executing the garbage collection operation, the secure erase unit 244 executes at least the block erase on one or more first free blocks where the secure erase target data is stored, among the free blocks managed in the free block list 35.

In this case, the one or more first free blocks include (i) one or more blocks that are not used as copy destination blocks, among one or more copy source blocks that become free blocks where no valid data are stored by copying, and (ii) one or more free blocks that are not used as copy destination blocks, among free blocks that have been existing since before the start of the garbage collection operation and where invalid data of the secure erase target logical area are stored. The invalid data of the secure erase target logical area in (ii) include data of the secure erase target logical area, which has already been invalidated before the start of the physical secure erase operation.

The secure erase unit 244 executes the process of finding free blocks corresponding to (i) and free blocks corresponding to (ii) from the free blocks managed in the free block list 35, and executes at least the block erase for each of the found free blocks. Alternatively, the secure erase unit 244 may execute at least the block erase for each of the free blocks managed in the free block list 35.

As a result, the secure erase target data stored in each block that remains as a free block after the garbage collection operation is securely erased by at least the block erase. In addition, the secure erase target data stored in several blocks that are reused as copy destination blocks are securely erased by overwriting (i.e., block erase+overwriting using the secure erase non-target valid data).

Note that after executing the garbage collection operation, the secure erase unit 244 may execute the block erase for each free block where the secure erase target data is stored, and may write a specific data pattern such as all 0 or all 1 or a combination thereof to each free block. In addition, the secure erase unit 244 may generate and write an error correction code corresponding to the specific data pattern. Furthermore, the secure erase unit 244 may write the logical area identifier that has been written before the block erase to the block where the block erase has been executed. According to this, all of the secure erase target data are also securely erased by the block erase and overwriting with a specific data pattern.

Next, the Audit function will be described. As described previously, when the secure erase target data is securely erased by the block erase or overwriting, a physical storage location where the secure erase target data was stored either stores data of another logical area or is in the erased state. The host 2 can issue a read command to specify the secure erase target logical area identifier in order to confirm whether or not the secure erase for the secure erase target data has been successfully executed. The controller 4 which has been caused to transition to the Audit mode reads data from the physical storage location where the secure erase target data was stored, based on the read command, and transmits the read data to the host 2. As described below, the data read from this physical storage location is, for example, initial data, secure erase non-target valid data used for overwriting, data having a specific data pattern, or incorrect data.

To realize the Audit function, the Audit function execution unit 245 stores the secure erase target logical area identifier when receiving a specific command to request the secure erase operation with the Audit function. Before the unmap operation based on this specific command, the mapping information copy unit 241 stores a copy of the mapping information that corresponds to the secure erase target logical area. For example, the mapping information copy unit 241 stores a copy of the mapping information that corresponds to the secure erase target logical area as valid management data in a free block.

The Audit function execution unit 245 causes the controller 4 to transition to the Audit mode after the execution of the secure erase operation based on the specific command to request the secure erase operation with the Audit function.

Then, when receiving a read command from the host 2 while being in the Audit mode, the controller 4 determines whether or not a logical area identifier included in the received read command is the same as the stored secure erase target logical area identifier. If the read command includes a logical area identifier that is different from the stored secure erase target logical area identifier, the controller 4 reads data from a physical storage location in the NAND flash memory 5 corresponding to a physical address indicated by the mapping information in the L2P table 37, and transmits the read data to the host 2. As a result, the controller 4 can successfully process the read command that specifies the logical area other than the secure erase target logical area.

In contrast, if the received read command includes the same logical area identifier as the stored secure erase target logical area identifier, the controller 4 reads data from a physical storage location in the NAND flash memory 5 that corresponds to a physical address indicated by the copy of the mapping information stored by the mapping information copy unit 241, and transmits the read data to the host 2.

If the physical storage location indicated by this physical address is in the erased state or if a specific data pattern has been overwritten to this physical storage location without an error correction code that corresponds to this specific data pattern, error correction may fail in the ECC encode/decode unit 17. This is because the correct code word that includes a pair of data and an error correction code consistent with this data is not stored in this physical storage location. In this case, the controller 4 may transmit the data itself (i.e., the data before the error correction) read from the physical storage location in the NAND flash memory 5 to the host 2. This data is, for example, the initial data (for example, all-1 data) in a case where this physical storage location is in the erased state, or the specific data pattern used for overwriting in a case where this physical storage location has been overwritten. Alternatively, the controller 4 may transmit notification of an uncorrectable error to the host 2 as a completion response corresponding to the received read command.

When the physical storage location indicated by this physical address has been reused as a copy destination block 54, or when a specific data pattern and an error correction code corresponding to this pattern have been overwritten to this physical storage location without a logical area identifier, the logical area identifier mapped to the physical address indicated in the copy of the mapping information does not match the logical area identifier read from this physical storage location together with the data. In this case, the controller 4 may transmit incorrectness of the read data to the host 2 as a completion response corresponding to the received read command.

If the completion response received from the SSD 3 indicates an error (uncorrectable error or incorrect data), the host 2 can confirm that the secure erase for the secure erase target data has been successfully executed. Alternatively, if the data received from the SSD 3 is different from the secure erase target data, the host 2 can confirm that the secure erase for the secure erase target data has been successfully executed. The host 2 may detect that the data received from the SSD 3 is different from the secure erase target data by, for example, storing a hash value for each data associated with each logical area identifier.

When receiving a write command from the host 2 while being in the Audit mode, the controller 4 determines whether or not a logical area identifier included in the received write command is the same as the stored secure erase target logical area identifier. If the write command includes a logical area identifier that is different from the stored secure erase target logical area identifier, the controller 4 writes data associated with the write command to a write destination block 56 and updates the mapping information in the L2P table 37. At this time, the copy of the mapping information stored by the mapping information copy unit 241 is maintained without being updated.

In contrast, when the write command includes the same logical area identifier as the stored secure erase target logical area identifier, the controller 4 discards the stored secure erase target logical area identifier and the copy of the mapping information and exits the Audit mode. After that, the controller 4 writes the data associated with the write command to the write destination block 56 and updates the mapping information in the L2P table 37. Thus, when the same logical area identifier as the secure erase target logical area identifier is specified by a read command received subsequently to the write command, the controller 4 can read the updated data newly written to the write destination block 56 and transmit the read updated data to the host 2.

In addition, when receiving a command to instruct the end of the Audit mode from the host 2, the controller 4 discards the stored secure erase target logical area identifier and the copy of the mapping information. Then, the controller 4 exits the Audit mode.

The Audit function for the secure erase target data is thus realized. Note that target data for the Audit function is only the secure erase target data associated with the secure erase target logical area identifier specified by the specific command requesting the Audit function. In other words, secure erase target data previously associated with the secure erase target logical area identifier is not subject to the Audit function.

It is assumed in the following descriptions that a first specific command, which requests a secure erase operation for data of a specific namespace, is used as the above-described specific command. The first specific command uses a namespace identifier (NSID) that identifies the specific namespace as a logical area identifier indicating the secure erase target logical area. In addition, the first specific command requests execution of the secure erase operation with the Audit function.

FIG. 5 is a flowchart illustrating a procedure of the physical secure erase operation executed in the memory system according to the first embodiment.

When the controller 4 receives a command from the host 2 (step S102), the CPU 12 determines whether or not this received command is the first specific command (step S104).

If the received command is not the first specific command (NO in step S104), the CPU 12 executes a process according to the received command (step S106).

If the received command is the first specific command (YES in step S104), in step S108, the Audit function execution unit 245 stores an NSID included in the received first specific command as the NSID of the specific namespace (secure erase target namespace).

The mapping information copy unit 241 stores a copy of the mapping information that corresponds to the secure erase target namespace (step S110). More specifically, the mapping information copy unit 241 stores a copy of the mapping information that corresponds to the secure erase target namespace, among the mapping information stored in the L2P table 37, in the NAND flash memory 5, the SRAM 16, or the DRAM 6.

The unmap unit 242 execute the unmap operation to invalidate all data in the secure erase target namespace (step S112).

In step S112, for example, the unmap unit 242 deletes the physical address in each of the entries in the L2P table 37 that corresponds to all LBAs of the secure erase target namespace. Alternatively, the unmap unit 242 stores NULL values in these entries. By this unmap operation, all clusters that correspond to the secure erase target namespace become invalid in the L2P table 37. In other words, the data associated with all clusters that correspond to the secure erase target namespace are recognized internally as data which may be discarded. As a result, all data in the secure erase target namespace become invalid data.

It has been described that the copy operation of the mapping information in step S110 and the unmap operation in step S112 are executed as separate procedures, but these operations may be executed simultaneously. In this case, the mapping information copy unit 241 may copy the mapping information that corresponds to the unmap target logical area to the NAND flash memory 5, the SRAM 16, or the DRAM 6 immediately before the unmap operation is executed.

If all the data stored in a certain active block are secure erase target data, this active block becomes a free block where only invalid data are stored at the end of the unmap operation.

If a certain active block stores both the secure erase target data and valid data of the secure erase non-target namespace, this active block stores the invalid data of the secure erase target data and the valid data of the secure erase non-target namespace at the end of the unmap operation.

The GC unit 243 executes the garbage collection operation (GC operation) such that the blocks in which the secure erase target data (invalid data) and the valid data of the secure erase non-target namespace are mixed together are eliminated from the active block group (step S114).

The GC unit 243 selects at least all of the active blocks that store the invalid data of the secure erase target namespace as the GC target blocks (i.e., copy source blocks). The active blocks that store the invalid data of the secure erase target namespace are blocks that store the invalid data of the secure erase target namespace and the valid data of the secure erase non-target namespace. Alternatively, when simply implementing the garbage collection operation, the GC unit 243 may select all of the active blocks that store at least the invalid data, as the copy source blocks, regardless of whether or not the invalid data are of the secure erase target namespace. The active blocks that store at least the invalid data are blocks that store the invalid data and valid data of the secure erase non-target namespace.

The GC unit 243 may store the block identifier of each active block selected as a copy source block, in the secure erase target block list 34.

The GC unit 243 can check data of which namespace is stored in each block, based on, for example, the information shown in FIG. 6.

FIG. 6 illustrates an example of a data structure written to each block. In the example in FIG. 6(*a*), pairs of the namespace identifiers and the LBA, and the data identified by the pairs, are written to each page. Therefore, the GC unit 243 can determine whether or not the block including the page stores data of the secure erase target namespace, by reading the pair of the namespace identifier and the LBA on each page.

In another example of the data structure written to each block, as shown in FIG. 6(*b*), a list of the namespace identifiers of the namespaces associated with the data stored in this block is written to anyone of the pages (for example, the last page) in addition to the information in FIG. 6(*a*). Therefore, the GC unit 243 can determine whether or not the block includes the data of the secure erase target namespace by reading only the page of each block in which this list is stored, without reading all the pages of each block. Note that the list of the namespace identifiers and a list of the LBAs associated with the data stored in this block may be written to any page of this block.

The descriptions return to those of step S114 in FIG. 5. The GC unit 243 selects any one free block among the free blocks. The GC unit 243 executes the block erase for the selected free block. The GC unit 243 allocates the free block for which the block erase has been executed as a copy destination block 54.

The GC unit 243 copies valid data among the data excluding the secure erase target data, i.e., the valid data of the secure erase non-target namespace, from the copy source block 52 to the copy destination block 54. The GC unit 243 updates the L2P table 37 to map each LBA of the valid data of the secure erase non-target namespace to each physical address of the copy destination.

When the valid data of the secure erase non-target namespace is copied, the valid data of the secure erase non-target namespace in the copy source block 52 becomes invalid data. Since all the LBAs in the secure erase target namespace have been unmapped before the copying, all of the data in the copy source block 52 become invalid data after the copy operation is executed. When all the valid data of the secure erase non-target namespace, which are stored in the copy source block 52, are copied to the copy destination block 54, the copy source block 52 becomes a free block. Therefore, when all the valid data of the secure erase non-target namespace in all the copy source blocks 52 are copied to several destination blocks, the secure erase target data no longer exist in the blocks other than the free blocks. In other words, the invalid data of the secure erase target namespace exist only in several free blocks.

The GC unit 243 determines whether or not the end condition of the garbage collection operation is met (step S122). When all the copying, from a block where the data of the secure erase target namespace and the valid data of the secure erase non-target namespace are mixed, of the valid data of the secure erase non-target namespace is completed, the secure erase target data (i.e., invalid data of the secure erase target namespace) is removed from all the active blocks. In other words, the invalid data of the secure erase target namespace exists only in the free blocks. Therefore, the end condition may be a condition that a block which stores the invalid data of the secure erase target namespace no longer exists in the active block group.

The GC unit 243 continues to execute the GC operation of step S114, until a block which stores the invalid data of the secure erase target namespace no longer exists in the active block group (NO in step S122, step S114).

When the end condition of the garbage collection operation is met (YES in step S122), the GC unit 243 ends the GC operation. At this time, there is no longer any possibility that the invalid data of the secure erase target namespace exists in other than the free blocks.

The secure erase unit 244 executes at least a block erase operation for each free block in which the invalid data of the secure erase target namespace is stored (step S124). Note that a copy source block reused as the copy destination block has already been block-erased by the garbage collection operation in step S114. Therefore, all of the data of the secure erase target namespace is securely erased by the block erase operation executed in step S114 for each copy source block which was reused as the copy destination block, or in step S124.

In step S124, the secure erase unit 244 may execute the block erase for each free block in which the invalid data of the secure erase target namespace is stored, and may also write a specific data pattern to each of these free blocks. As a result, the invalid data of the secure erase target namespace stored in each free block is overwritten with the specific data pattern. When the copy source block is reused as the copy destination block, the invalid data of the secure erase target namespace stored in this copy source block has already been overwritten with the valid data of other namespaces by the garbage collection operation in step S114. Therefore, all of the data of the secure erase target namespace is securely erased by the overwriting executed in step S114 or in step S124.

The secure erase unit 244 may execute the block erase for all of the free blocks. As a result, the process in step S124 of executing at least the block erase for each free block in which the invalid data of the secure erase target namespace is stored can easily be executed.

Alternatively, in order to reduce the number of blocks to be block-erased, the secure erase unit 244 may execute a process to identify one or more free blocks in which the invalid data of the secure erase target namespace is stored, and execute the block erase only for the identified one or more free blocks.

In any one of the former and latter cases, at least one or more free blocks in which the invalid data of the secure erase target namespace is stored are subject to the physical secure erase operation.

In the latter case, and when only an active block which stores the invalid data of the secure erase target namespace is set as the GC target block in step S114, the secure erase unit 244 may classify the free blocks which exist at the start of step S124, into Group I of free blocks created by the GC operation in step S114 (i.e., the group of blocks managed in the secure erase target block list 34) and Group II of the other free blocks. The secure erase unit 244 can easily determine, without checking the contents of each free block belonging to Group I, that a free block belonging to Group I stores the invalid data of the secure erase target namespace. The secure erase unit 244 can determine, by checking the contents of each free block belonging to Group II, whether or not a free block belonging to Group II stores the invalid data of the secure erase target namespace.

When the process in step S124 is completed, the erase control unit 24 notifies the host 2 of the completion of the first specific command by transmitting a response indicating the completion of the first specific command to the host 2 (step S126).

Then, the Audit function execution unit 245 executes the Audit function (step S128). In step S128, the controller 4 transmits to the host 2 data which enables it to confirm whether or not the secure erase has been successfully executed, using the NSID stored in step S108 and the copy of the mapping information stored in step S110, in response to a read command issued by the host 2. Details of the procedure in step S128 will be described with reference to flowcharts in FIG. 7A and FIG. 7B.

Figure 7B:
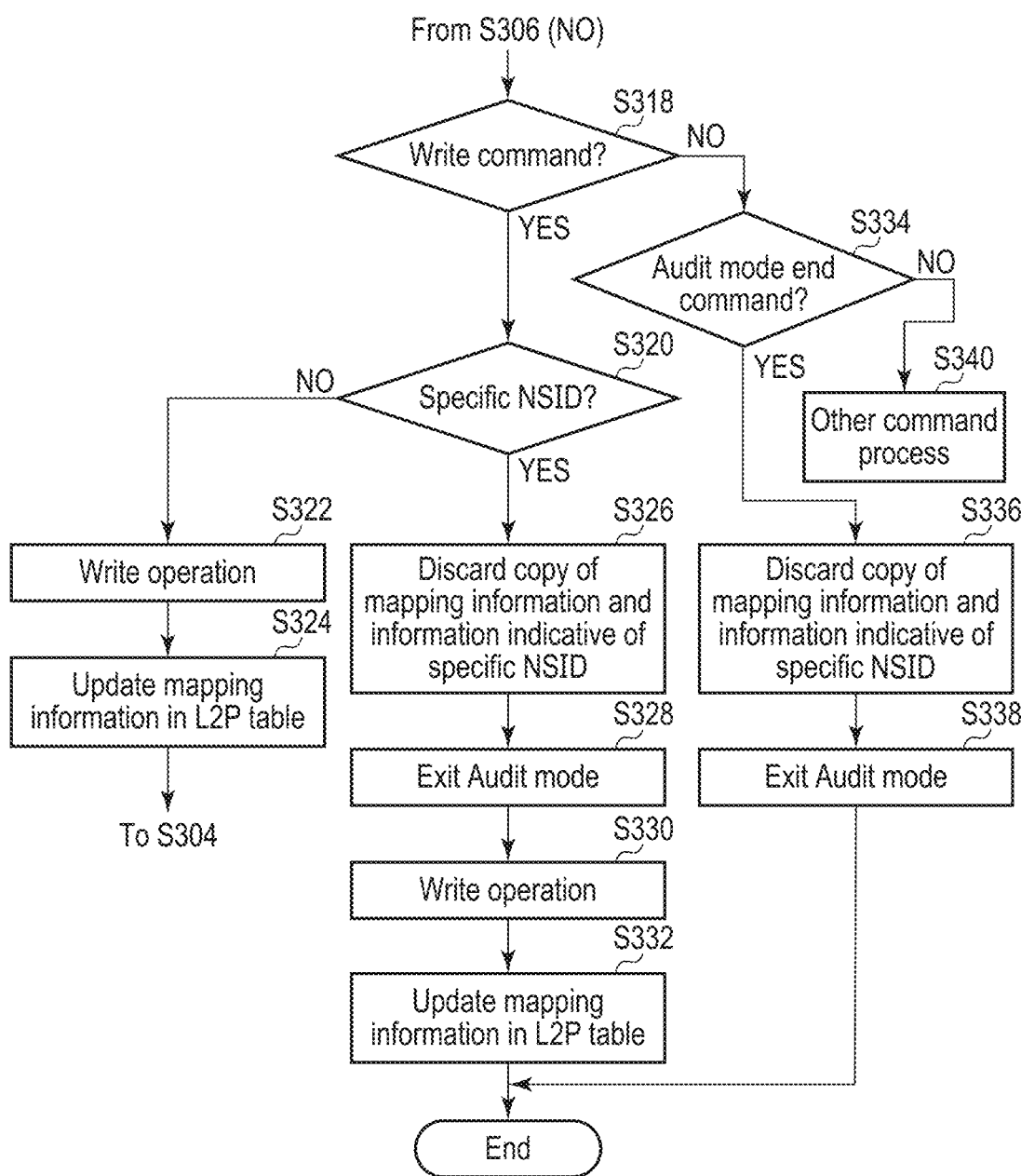
FIG. 7B is a flowchart illustrating a remaining procedure of the process related to the Audit function executed in the memory system according to the first embodiment.

FIG. 7A is a flowchart illustrating several steps of the process related to the Audit function executed in the memory system according to the first embodiment. FIG. 7B is a flowchart illustrating the remaining steps of the process related to the Audit function.

When notifying the host 2 of the completion of the first specific command in step S126 described with reference to FIG. 5, the Audit function execution unit 245 causes the controller 4 to transition to the Audit mode, as shown in FIG. 7A (step S302).

The controller 4 determines whether or not a command is received from the host 2 (step S304).

When the command is not received from the host 2 (No in step S304), the controller 4 waits until the command is received.

When the command is received from the host 2 (YES in step S304), the controller 4 determines whether or not the received command is a read command (step S306).

If the received command is a read command (YES in step S306), in step S308, the controller 4 determines whether or not the NSID included in the received read command matches the NSID of the secure erase target namespace stored in step S108 as described with reference to FIG. 5. Note that the controller 4 may change the order of execution of step S306 and step S308. In this case, the controller 4 may omit the process of step S320.

If the NSID included in the received read command does not match the NSID of the secure erase target namespace (NO in step S308), the controller 4 obtains a physical address which is mapped to the logical address included in the received read command from the mapping information in the L2P table 37, by referring to the mapping information in the L2P table 37 (step S310).

The controller 4 reads data from the physical storage location in the NAND flash memory 5 indicated by the physical address obtained in step S310 and transmits the read data to the host 2 (step S312), and the processing of the controller 4 returns to step S304. In other words, the controller 4 waits until a next command is received.

If the NSID included in the received read command matches the NSID of the secure erase target namespace (YES in step S308), in step S314, the controller 4 obtains a physical address which is mapped to the logical address included in the received read command, from the copy of the mapping information by referring to the copy of the mapping information stored in step S110. The physical address mapped to this logical address before the start of the secure erase operation is stored in the copy of the mapping information.

The controller 4 reads data from the physical storage location in the NAND flash memory 5 indicated by the physical address obtained in step S314 and transmits the read data to the host 2 (step S316). Then, the processing of the controller 4 returns to step S304.

If the received command is not a read command (NO in step S306), the controller 4 determines whether or not the received command is a write command as shown in FIG. 7B (step S318).

If the received command is a write command (YES in step S318), in step S320, the controller 4 determines whether or not the NSID included in the received write command matches the NSID corresponding to the secure erase target namespace stored in step S108.

If the NSID included in the write command does not match the NSID of the secure erase target namespace (NO in step S320), the controller 4 writes data associated with the write command to the NAND flash memory 5 (step S322).

The controller 4 updates the mapping information in the L2P table 37 such that the physical address indicating the physical storage location where the data associated with the write command is written is mapped to the logical address specified by the write command (step S324). Then, the processing of the controller 4 returns to step S304 in FIG. 7A.

If the NSID included in the write command matches the NSID of the secure erase target namespace (YES in step S320), the controller 4 discards the copy of the mapping information and the NSID of the secure erase target namespace (step S326). Then, the controller 4 exits the Audit mode (step S328) and ends the Audit function. After exiting the Audit mode, the controller 4 writes the data that is associated with the write command to the NAND flash memory 5 (step S330). The controller 4 updates the mapping information in the L2P table 37 such that the physical address indicating the physical storage location where the data associated with the write command is written is mapped to the logical address specified by the write command (step S332).

If the received command is not a write command (NO in step S318), the controller 4 determines whether or not the received command is an Audit mode end command (step S334).

If the received command is an Audit mode end command (YES in step S334), the controller 4 discards the copy of the mapping information and the NSID of the secure erase target namespace (step S336), exits the Audit mode (step S338), and ends the Audit function.

If the received command is not an Audit mode end command (NO in step S334), the controller 4 executes the command processing based on the received command (step S340).

Next, the handling of I/O commands when a first specific command requesting the secure erase of the data of the specific namespace is received will be described. Examples of the I/O commands include a write command, a read command, and an unmap command.

First, the handling of the I/O commands which are received before the first specific command is received and which are not yet completed when the first specific command is received will be described.

In the processing of the first specific command, an operation of storing the copy of the mapping information that corresponds to the secure erase target area and an unmap operation of invalidating the secure erase target data are executed. Therefore, in order to prevent the mapping information that corresponds to the secure erase target logical area from being updated by the processing of the I/O commands during the processing of the first specific command, the controller 4 aborts an uncompleted write command for the secure erase target logical area (in this case, the secure erase target namespace) and an uncompleted unmap command for the secure erase target namespace.

Alternatively, the controller 4 may wait for completion of the processing of the uncompleted write command or the uncompleted unmap command, and start the execution of the first specific command after the processing of these commands is completed. In particular, if the processing of these commands is near completion, the controller 4 may start the execution of the first specific command after the processing of these commands is completed, without aborting these commands.

Figure 8:
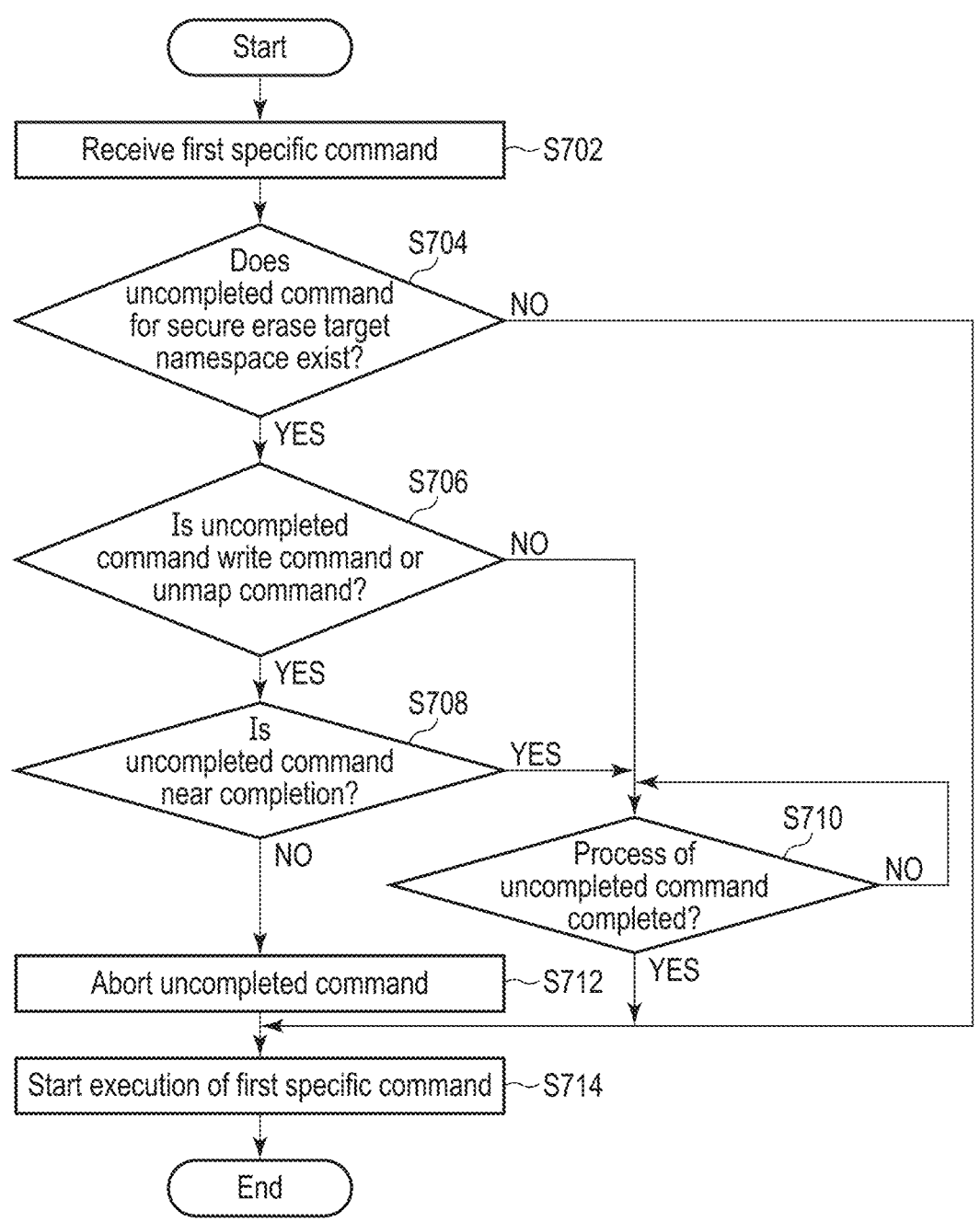
FIG. 8 is a flowchart illustrating a procedure of a process for an I/O command received before a first specific command is received, which is executed in the memory system according to the first embodiment.

FIG. 8 is a flowchart illustrating the procedure for processing the I/O commands which are received before the first specific command is received and which are not yet completed when the first specific command is received.

The controller 4 receives the first specific command that requests the secure erase of the data of the specific namespace from the host 2 (step S702). The controller 4 determines whether or not I/O commands which are being executed for this specific namespace (secure erase target namespace) or I/O commands which have been received but have not yet been executed for the secure erase target namespace exist (step S704). These I/O commands are hereinafter referred to as uncompleted commands.

If an uncompleted command for the secure erase target namespace exists (YES in step S704), in step 706, the controller 4 determines whether the uncompleted command is a command which causes the mapping information that corresponds to the secure erase target logical area to be updated (for example, a write command or an unmap command).

If the uncompleted command is a command which causes the mapping information to be updated (YES in step S706), the controller 4 determines whether or not the processing of this command is near completion (step S708).

If the processing of the command is not near completion (NO in step S708), the controller 4 aborts the uncompleted commands (step S712). In step S712, if commands received from the host 2 are not allowed to be executed in any order (out of order), the controller 4 aborts all subsequent I/O commands received from the host 2 after receiving the aborted uncompleted command.

After aborting the uncompleted commands, the controller 4 starts execution of the first specific command (step S714).

If the processing of the uncompleted command is near completion (YES in step S708), the controller 4 may not abort the uncompleted command and wait for the completion of processing of the uncompleted command (step S710, NO in step S710). Then, in response to completion of the processing of the uncompleted command (YES in step S710), the controller 4 starts execution of the first specific command (step S714).

If the uncompleted command for the secure erase target namespace is not a write command or an unmap command, for example, if an uncompleted read command for the secure erase target namespace exists (NO in step S706), the controller 4 does not abort the uncompleted command but waits for the completion of the processing of the uncompleted command (step S710, NO in step S710). Then, in response to completion of the processing of the uncompleted command, the controller 4 starts execution of the first specific command (step S714).

Figure 9:
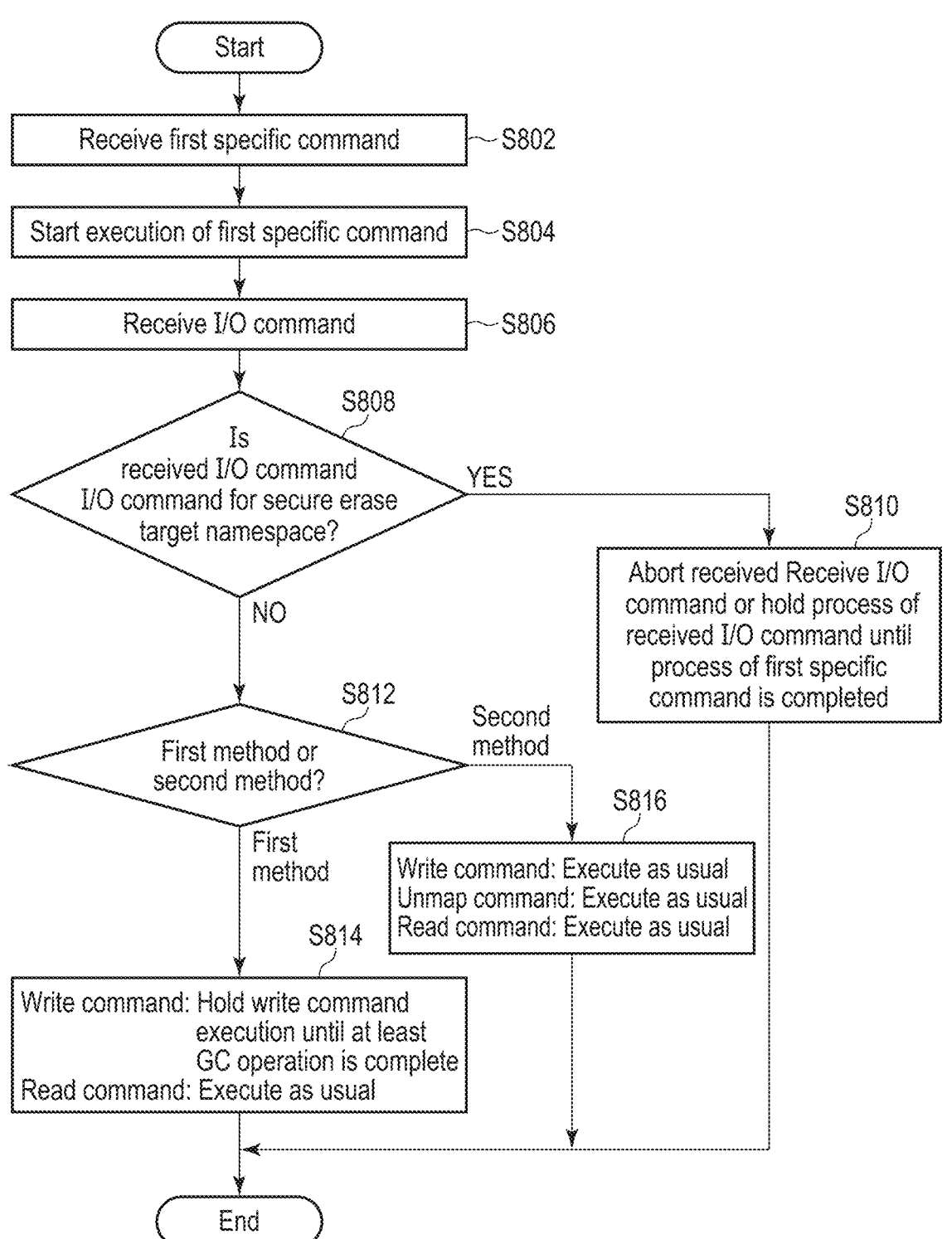
FIG. 9 is a flowchart illustrating a procedure of a process for an I/O command received during executing the first specific command, which is executed in the memory system according to the first embodiment.

Next, the handling of I/O commands received during execution of the first specific command will be described with reference to FIG. 9. FIG. 9 is a flowchart illustrating the procedure for processing the I/O commands which are received while the first specific command is being executed.

The controller 4 receives the first specific command requesting the secure erase of the data of the specific namespace (step S802) and starts execution of the first specific command (step S804). If an I/O command is received during the execution of the first specific command (step S806), the controller 4 determines whether or not the received I/O command is an I/O command for this specific namespace (secure erase target namespace) (step S808).

If the I/O command received during the execution of the first specific command is an I/O command for the secure erase target namespace (YES in step S808), the controller 4 aborts the received I/O command (step S810). Alternatively, in step S810, the controller 4 may hold the execution of the received I/O command until the processing of the first specific command is completed (i.e., until the completion of the first specific command is notified to the host 2), and execute the received I/O command after the completion of the processing of the first specific command.

If the I/O command received during the execution of the first specific command is an I/O command for a namespace other than the secure erase target namespace (NO in step S808), the controller 4 can selectively use a first method or a second method to be described below. The controller 4 determines which of the first method and the second method is to be selected (step S812). When selecting the first method, the controller 4 executes the process in step S814. When selecting the second method, the controller 4 executes the process in step S816.

First method (step S814): If the I/O command for the other namespace is a write command, the controller 4 holds execution of this write command until at least the GC operation is completed, and executes the write command after the GC operation is completed.

If the I/O command for the other namespace is a read command, the controller 4 executes this read command as usual. Note that, if commands received from the host 2 are not allowed to be executed in any order (out of order), the controller 4 executes read commands for the other namespaces in the same order as the order in which these read commands have been received. Then, when a write command for the other namespace is received subsequent to the read command for the other namespace, processing of the received write command and all the I/O commands for the other namespace subsequent to the received write command is suspended until at least the GC operation is completed. After the GC operation is completed, the controller 4 executes this received write command and all the I/O commands for the other namespace subsequent to the received write command, in the same order as the order in which these commands have been received.

Note that, in the first method, the controller 4 may or may not treat the unmap commands in the same manner as the write commands. If the controller 4 does not treat the unmap commands in the same manner as the write commands, the controller 4 executes the unmap commands in the same manner as usual, like the read commands are executed as usual.

Second method (step S816): If the I/O command for the other namespace is a write command, an unmap command, or a read command, the controller 4 executes this I/O command as usual. This second method has an effect that the processing of the I/O command for the other namespaces is not delayed significantly, but the time required to process the first specific command is increased by the processing of this I/O command. Furthermore, even invalid data created by writing the write data (updated data) associated with the write command for the other namespace may be subject to the GC operation. In this case, the time required to process the first specific command further increases.

Next, examples of the secure erase operations for data of a specific namespace will be described with reference to FIG. 10A, FIG. 10B, FIG. 11, FIG. 12A, and FIG. 12B.

FIG. 10A illustrates an example of the contents of each active block before the start of the secure erase operation. FIG. 10A illustrates an example in a case where three blocks, i.e., a block BLK0, a block BLK1, and a block BLK2, are active blocks in which valid data are stored.

The block BLK0 is an active block in the process of writing data, which is allocated to a write destination block. In the block BLK0, unwritten storage areas illustrated by blank spaces remain. Each of the block BLK1 and the block BLK2 is a written active block where data are written to the end of the block.

When the controller 4 manages three namespaces, i.e., a namespace A, a namespace B, and a namespace C, data in the namespace A, data in the namespace B, and data in the namespace C may be mixed in each of the block BLK0, the block BLK1, and the block BLK2. Furthermore, valid data and invalid data may exist together in each of the block BLK0, the block BLK1, and the block BLK2.

FIG. 10B illustrates another example of the contents of each free block before the start of the secure erase operation. FIG. 10B illustrates an example in a case where four blocks, i.e., a block BLK3, a block BLK4, a block BLK5, and a block BLK6, are free blocks in which valid data are not stored.

In FIG. 10B, invalid data of the namespace A and invalid data of the namespace C are stored, but invalid data of the namespace B is not stored in the free block BLK3. In each of the free blocks BLK4 to BLK6, invalid data of the namespace A, invalid data of the namespace B, and invalid data of the namespace C are stored.

It is assumed that a case where the SSD 3 receives the first specific command that requests the secure erase of the data of the namespace B from the host 2 while the nonvolatile memory 5 includes three active blocks shown in FIG. 10A and four free blocks shown in FIG. 10B.

In this case, the unmap unit 242 executes an unmap operation to invalidate the data associated with all LBAs belonging to the namespace B.

FIG. 11 illustrates an example of contents of each active block after the unmap operation is executed. In FIG. 11, bold letters indicate the data of the namespace B, which newly become invalid data by this unmap operation.

The block BLK0 stored one piece of invalid data of the namespace B and two pieces of valid data of the namespace B, as shown in FIG. 10A before the unmap operation is executed. As shown in FIG. 11, all of the two pieces of valid data of the namespace B in the block BLK0 become invalid data by the unmap operation.

The block BLK1 stored two pieces of invalid data of the namespace B and four pieces of valid data of the namespace B, as shown in FIG. 10A before the unmap operation is executed. As shown in FIG. 11, all of the four pieces of valid data of the namespace B in the block BLK1 become invalid data by the unmap operation.

The block BLK2 stored three pieces of invalid data of the namespace B and four pieces of valid data of the namespace B, as shown in FIG. 10A before the unmap operation is executed. As shown in FIG. 11, all of the four pieces of valid data of the namespace B in the block BLK2 become invalid data by the unmap operation.

After executing the unmap operation, the GC unit 243 selects all of the active blocks that store the invalid data of the namespace B as the GC target blocks, i.e., the copy source blocks, and executes the GC operation.

In FIG. 11, each of the block BLK0, the block BLK1, and the block BLK2, which are the active blocks, stores the invalid data of the namespace B. Therefore, all the three active blocks, i.e., the block BLK0, the block BLK1, and the block BLK2, are selected as the copy source blocks.

FIG. 12A illustrates an example of contents of each active block after executing the GC operation. In FIG. 12A, symbols (A), (B), and (C) in each of the physical storage locations indicate that the namespaces corresponding to data previously (i.e., before the GC operation) stored in the physical storage locations are namespace A, namespace B, and namespace C, respectively.

FIG. 12A shows an example in a case where the blocks BLK6 and BLK5, which have been free blocks since before the GC operation, are used as copy destination blocks by the GC operation and become active blocks by copying the valid data.

The block BLK6 becomes an active block by copying the valid data from each of the blocks BLK1 and BLK2 to the block BLK6. As a result of the copying, all of the valid data of each of the namespace A and the namespace C stored in the block BLK1 and all of the valid data of each of the namespace A and the namespace C stored in the block BLK2 are stored in the block BLK6.

The block BLK5 becomes an active block by copying the valid data from the block BLK0 to the block BLK5. By the copying, all of the valid data of the namespace A and the namespace C, which were stored in the block BLK0, are stored in the block BLK5.

The GC operation of causing the state of each of the blocks BLK6 and BLK5 to transition from the free blocks shown in FIG. 10B to the active blocks shown in FIG. 12A will be described below. The GC unit 243 executes the block erase for the block BLK6. Then, the GC unit 243 copies the valid data remaining in the block BLK1 after the execution of the unmap operation, which invalidates the data of the namespace B, i.e., copies the valid data of namespaces other than the namespace B, from the block BLK1 to the block BLK6. At this time, the GC unit 243 copies the valid data of the namespaces other than the namespace B such that the valid data are continuously arranged in a plurality of physical storage locations in the block BLK6.

Furthermore, the GC unit 243 copies the valid data remaining in the block BLK2 after the execution of the unmap operation, which invalidates the data of the namespace B, i.e., copies the valid data of the namespaces other than the namespace B, from the block BLK2 to the block BLK6. At this time, the GC unit 243 copies the valid data of the namespaces other than the namespace B such that the valid data are continuously arranged in a plurality of subsequent physical storage locations in the block BLK6.

As a result, the block BLK6 is filled with the valid data of the namespaces other than the namespace B, which were stored in the block BLK1 and the block BLK2. As a result, the invalid data of the namespace B stored in the block BLK6, which was a free block before the GC operation, is overwritten with the valid data of the namespaces other than the namespace B.

In FIG. 12A, the bold letters indicate the physical storage locations where the data of the namespace B are erased. The invalid data of the namespace B stored in the block BLK6, which was a free block before the GC operation, is overwritten with the valid data of the namespaces other than the namespace B.

Similarly, the GC unit 243 executes the block erase for block BLK5. Then, the GC unit 243 copies the valid data remaining in the block BLK0 after the execution of the unmap operation, which invalidates the data of the namespace B, i.e., copies the valid data of the namespaces other than the namespace B, from the block BLK0 to the block BLK5. At this time, the GC unit 243 copies the valid data of the namespaces other than the namespace B such that the valid data are continuously arranged in a plurality of physical storage locations in the block BLK5. Note that data are not written to the end of the block BLK5 in this example, but the remaining physical storage locations may be filled with, for example, dummy data such as all 0.

Referring to FIG. 12A again while paying attention to the bold letters, the invalid data of the namespace B stored in the block BLK5 have been overwritten with the valid data of the namespaces other than the namespace B or the physical storage locations where the invalid data was stored are in the erased state.

By the above-described GC operation, the blocks BLK0 to BLK2 where the data (invalid data) of the namespace B were stored become free blocks. In addition, the two blocks, i.e., the block BLK5 and the block BLK6, which have newly become active blocks, store only valid data of the namespaces other than the namespace B and do not store data of the namespace B. Therefore, blocks where data of the secure erase target namespace and valid data of the secure erase non-target namespace are mixed together will no longer exist in the active block group.

FIG. 12B illustrates another example of contents of each free block after executing the GC operation. After the GC operation is executed, three blocks (BLK0, BLK1, and BLK2), which become free blocks by the GC operation, and two blocks (BLK3 and BLK4), which have been free blocks since before the start of the GC operation, are included in the free blocks managed in the free block list 35.

Each of the free block BLK0, the free block BLK1, and the free block BLK2 is a block which becomes a free block by the GC operation and which is not used as a copy destination block for the GC operation. The free block BLK0, the free block BLK1, and the free block BLK2 store the invalid data of the secure erase target namespace B, but do not store the valid data of the secure erase non-target namespaces A and C. Therefore, the controller 4 executes the block erase for each of the free block BLK0, the free block BLK1, and the free block BLK2.

By executing the block erase on each of the free block BLK0, the free block BLK1, and the free block BLK2, the controller 4 can securely erase the data of the secure erase target namespace B in each of the free block BLK0, the free block BLK1, and the free block BLK2.

Note that, in the GC operation, any block of the free block BLK0, the free block BLK1, and the free block BLK2 can be reused as a copy destination block for the GC operation. The block to be reused as the copy destination block is first block-erased. Then, the data of the secure erase target namespace B stored in the block to be reused as the copy destination block is overwritten with the valid data of the secure erase non-target namespace to be copied from the copy source block. Thus, the data of the secure erase target namespace B stored in the block to be reused as the copy destination block is securely erased by the block erase and the overwrite executed during the GC operation.

The free block BLK3 is a block which has been a free block since before the start of the GC operation and which is not used as a copy destination block for the GC operation. The free block BLK3 does not store data of the secure erase target namespace B. For this reason, the controller 4 does not need to execute the block erase for the free block BLK3.

The free block BLK4 is a block which has been a free block since before the start of the GC operation and which is not used as a copy destination block for the GC operation. The free block BLK4 includes invalid data of the secure erase target namespace B. Therefore, the block erase for the free block BLK4 is executed. As a result, the data of the secure erase target namespace B are securely erased from the free block BLK4.

As described above, according to the first embodiment, the operation of storing the copy of the mapping information corresponding to the secure erase target namespace is executed, in response to receiving the first specific command requesting the secure erase of the data of the specific namespace from the host 2. Then, the unmap operation of invalidating the data of the secure erase target namespace, and the GC operation of copying the valid data of the data of namespaces other than the secure erase target namespace, from one or more blocks (copy source blocks) where the data of the secure erase target namespace are stored to one or more copy destination blocks, are executed.

As a result, since one or more blocks where the data of the secure erase target namespace were stored become free blocks, the data of the secure erase target namespace do not exist other than the free blocks.

When the copy source blocks become free blocks, the free blocks can be reused as copy destination blocks. In this case, the data of the secure erase target namespace, which are stored in the free block, are erased by the block erase and further overwritten with the valid data of the data of the namespaces other than the secure erase target namespace.

Thus, in the first embodiment, a part of the data (valid data and invalid data) of the specified specific namespace can be securely erased by the block erase and/or overwrite during the GC operation. In addition, the data of the specific namespace, which are stored in one or more free blocks, can be securely erased by at least the block erase after the GC operation. As a result, all of the data (valid data and invalid data) of the specific namespace are securely erased.

Thus, the controller 4 transitions to the Audit mode after executing the secure erase operation. In the Audit mode, the controller 4 refers not to the L2P table 37, but to a copy of the mapping information, in response to receiving, from the host 2, a read command that specifies the secure erase target namespace. As a result, the controller 4 can obtain the physical address mapped to each logical address in the secure erase target namespace before the start of the secure erase operation. The controller 4 executes the read operation to read data from the physical storage location in the NAND flash memory 5 that corresponds to the physical address indicated by the copy of the mapping information. Then, the controller 4 transmits the read data to the host 2.

The host 2 can confirm whether or not the secure erase target data are securely erased in the NAND flash memory 5 by comparing the data received from the controller 4 in the Audit mode with the secure erase target data.

Then, when receiving, from the host 2, a write command that specifies the secure erase target namespace, the controller 4 discards the copy of the mapping information and the information indicating of the stored secure erase target namespace, and exits the Audit mode. After exiting the Audit mode, the controller 4 executes the write process and the process of updating the mapping information of the L2P table 37.

Next, advantages of the secure erase operation according to the first embodiment will be described in comparison with several comparative examples.

First, differences between configurations of SSDs according to several comparative examples and the configuration of the SSD 3 according to the first embodiment will be described.

Comparative Example #1

In an SSD according to a comparative example #1, a plurality of endurance groups are managed such that a plurality of namespaces respectively belong to a plurality of endurance groups different from each other. The endurance group is a unit of managing the physical resources of NAND flash memory. All physical resources of the NAND flash memory are classified into a plurality of endurance groups such that each block of the NAND flash memory is used in only one endurance group. When the secure erase of data of a specific namespace is executed, each block in the endurance group corresponding to the specific namespace is subject to the secure erase.

Comparative Example #2

In an SSD according to a comparative example #2, all the physical resources of NAND flash memory belong to only one endurance group, but the correspondence between a plurality of namespaces and a plurality of blocks is managed on a one-to-one basis such that data of different namespaces are written to different blocks. When the secure erase of data of a specific namespace is executed, each block mapped to the specific namespace on a one-to-one basis is subject to the secure erase.

First Embodiment

In the SSD 3 according to the first embodiment, a plurality of namespaces are managed, but all physical resources of the NAND flash memory belong to only one endurance group, and data of a plurality of namespaces are allowed to be mixed together in the same block. This is because the secure erase operation of the first embodiment can execute the physical secure erase operation for the data of the specific namespace specified by the host 2 even in an environment where data of a plurality of namespaces are mixed together in the same block.

(1) Speed of User Data Erase

In the SSD 3 according to the first embodiment, the GC operation needs to be executed before the block erase. Therefore, a speed of the operation to secure-erase the user data is relatively slow. However, the data of the specific namespace are secure-erased in a case of, for example, for ceding a PC that includes the SSD3 to another person, erasing the user data of the specific namespace while maintaining data of another namespace where backup data of the OS are stored. Since the frequency of such cases is extremely small, the slow speed of the secure erase can be allowed.

In the comparative example #1 and the comparative example #2, the speed of the secure erase operation on the user data depends on the implementation, but the operation can be executed at a relatively high speed.

(2) Number of Partially Written Blocks

Here, using a configuration of writing user data from the host to an SLC storage area (SLC: single-level cell) of the NAND flash memory, and writing the user data from the SLC storage area to a TLC storage area (TLC: triple-level cell) or a QLC storage area (QLC: quad-level cell) when the SSD is idle or the like, is assumed.

In the SSD 3 according to the first embodiment, the number of necessary partially written blocks is two. One of the two blocks is an SLC block used as the write destination block for the SLC storage area. The other block is a TLC/QLC block used as the write destination block for the TLC/QLC storage area.

In the comparative examples #1 and the comparative example #2, the number of necessary SLC blocks is equal to the number of namespaces. The number of necessary TLC/QLC blocks is equal to the number of namespaces.

(3) Over-Provisioning

In the SSD 3 according to the first embodiment and the comparative example #2, an over-provisioning area can be shared by a plurality of namespaces.

In the comparative example #1, the over-provisioning area needs to be prepared separately for each namespace.

(4) SLC Storage Area

In the SSD 3 according to the first embodiment, the SLC storage area is shared among the namespaces, but it is possible for one namespace to temporarily use the entire capacity of the SLC storage area.

In the comparative example #1 and the comparative example #2, a dedicated SLC storage area needs to be prepared for each namespace. When the capacity required for one SLC storage area is fixed regardless of the namespace size, the number of blocks that can be allocated for the TLC/QLC storage areas is reduced. As a result, the storage capacity of the nonvolatile memory cannot be used efficiently, and the drive capacity (total capacity) expressed as the sum of the storage capacity of the TLC/QLC storage area and the storage capacity of all SLC storage areas, decreases in proportion to the number of namespaces.

(5) Alignment Between Block Size and Namespace Size

In general, the size of a single block is several tens of MB. In contrast, the size of each namespace is an integer multiple of a sector. Therefore, an inconsistency between the block size and the namespace size may occur.

In the SSD 3 according to the first embodiment, one block can be shared by a plurality of namespaces and, even if an inconsistency between the block size and namespace size occurs, the SSD 3 is less likely to be affected by the inconsistency and the capacity efficiency is less likely to decrease.

In the comparative example #1 and the comparative example #2, when an inconsistency between the block size and the namespace size occurs, the SSD is affected by the inconsistency and the capacity efficiency is reduced.

(6) Decrease in Drive Capacity Due to Creation of a Plurality of Namespaces

When a plurality of namespaces are created in a single SSD, the drive capacity may decrease for reasons (2) to (5).

In the SSD 3 according to the first embodiment, since only one endurance group exists, a plurality of namespaces can be created efficiently. Therefore, there is no decrease in drive capacity due to the creation of the plurality of namespaces.

In the comparative example #1, since a dedicated endurance group is required for each namespace, the decrease in drive capacity due to the creation of the plurality of namespaces is large.

In the comparative example #2, the degree of influence on the reduction of drive capacity by creating the plurality of namespaces is intermediate between the first embodiment and the comparative example #1.

Second Embodiment

Next, a second embodiment will be described. A configuration of an SSD according to the second embodiment is the same as the configuration of the SSD 3 according to the first embodiment shown in FIG. 1. In the second embodiment, similarly to the first embodiment, a physical secure erase operation for data of a specific namespace is executed, but the processing related to an unmap operation is different from that of the first embodiment. In the first embodiment, the controller 4 executes the unmap operation before the GC operation. In contrast, in the second embodiment, the controller 4 executes the unmap operation during the execution of the GC operation.

FIG. 13 is a flowchart illustrating a procedure of the physical secure erase operation executed in the memory system according to the second embodiment. Descriptions of the same procedure as that of the physical secure erase operation executed in the memory system according to the first embodiment, which has been described with reference to FIG. 5, will be omitted.

When the NSID of the secure erase target namespace is stored (step S108), the GC unit 243 executes the GC operation. The mapping information copy unit 241 executes the operation to copy the mapping information that corresponds to the secure erase target namespace, and the unmap unit 242 executes the unmap operation, during the execution of the GC operation (step S132).

In step S132, the GC unit 243 selects an active block storing at least data of the secure erase target namespace, i.e., the secure erase target data, as a GC target block (i.e., the copy source block), regardless of whether the data of the secure erase target namespace is valid data or invalid data. Alternatively, when simply implementing the GC operation, the GC unit 243 may select all of the active blocks that store at least the invalid data, as the copy source blocks, regardless of whether or not the data are the invalid data of the secure erase target namespace.

If the valid data stored in the copy source block is the secure erase target data, the mapping information copy unit 241 executes an operation of copying the mapping information that corresponds to the secure erase target data stored in the copy source block, from the L2P table 37 to the NAND flash memory 5, and the unmap unit 242 executes an unmap operation of invalidating the valid data stored in the copy source block. In other words, the mapping information copy unit 241 stores a copy of the mapping information indicating the physical storage location where the valid data that is the secure erase target data, among the valid data stored in the copy source block, is stored. Then, the unmap unit 242 executes an unmap operation of invalidating the valid data that is the secure erase target data, among the valid data stored in the copy source block. As a result, the mapping information copy unit 241 can copy the mapping information corresponding to the secure erase target data immediately before invalidated by the unmap unit 242, from the L2P table 37 to the NAND flash memory 5 or the like. When the valid data of the secure erase non-target namespace stored in the copy source block is copied to the copy destination block and when the unmap operation of the valid data of the secure erase target namespace stored in the copy source block is also executed, the copy source block becomes a free block. As a result, the secure erase target data no longer exists in other than the free blocks. In other words, the data (invalid data) of the secure erase target namespace exist only in several free blocks.

After the execution of the GC operation, the operation of copying the mapping information, and the unmap operation (step S132), the end condition for the GC operation is determined (step S122), the block erase operation is executed (step S124), and the host 2 is notified of the command completion (step S126), similarly to the first embodiment. Then, the Audit function execution unit 245 executes the Audit function (step S128).

Since the handling of I/O commands at the time of executing the first specific command requesting the secure erase of the data of the specific namespace and the processing related to the Audit function are the same as those in the first embodiment, their descriptions will be omitted.

In the second embodiment as well, the same advantages as those of the first embodiment can be obtained.

Third Embodiment

Next, a third embodiment will be described. A configuration of an SSD according to the third embodiment is the same as the configuration of the SSD 3 according to the first embodiment shown in FIG. 1. In the first and second embodiments, a namespace identifier has been used as a logical area identifier indicating a secure erase target logical area. However, in the third embodiment, a logical address identifying a secure erase target sector and the number of sectors from the logical address are used as the logical area identifiers indicating the secure erase target logical areas. For example, the LBA is used as the logical address. When the SSD 3 has a plurality of namespaces, the logical area identifier indicating the secure erase target logical area also includes a namespace identifier indicating the secure erase target namespace.

In the third embodiment, the secure erase target data is the data associated with one or more specific LBAs indicating one or more secure erase target sectors. In this case, the secure erase target data includes both the data currently associated with the LBA and data previously associated with the LBA.

A second specific command used in the third embodiment requires the secure erase to be executed for the data associated with one or more specific LBAs, more specifically, the data associated with one or more specific LBAs indicating one or more secure erase target sectors. The second specific command may include a parameter that specifies one or more specific LBAs. One or more specific LBAs may be represented by an LBA range. In addition, the second specific command requests execution of the secure erase operation with the Audit function.

When the host 2 sets a plurality of LBA ranges as secure erase targets, the host 2 may first transmit a plurality of commands each specifying an LBA range to the SSD 3 and then transmit a second specific command that requests the secure erase of one or more specific LBA ranges to the SSD 3. Of course, the second specific command may include a plurality of parameters that specify a plurality of LBA ranges. Thus, the GC operation to be described below may be executed only once by specifying a plurality of LBA ranges and requesting the secure erase. As a result, the amount of copied data and the number of times of erasing the blocks can be reduced as compared to requesting the secure erase for each LBA range, thereby reducing memory cell wear.

In addition, when the host 2 sets one or more specific LBAs or one or more specific LBA ranges of a specific namespace as the secure erase targets, the host 2 may specify a namespace identifier that identifies the specific namespace and one or more specific LBAs or one or more specific LBA ranges.

FIG. 14A is a flowchart illustrating a procedure of the physical secure erase operation executed in the memory system according to the third embodiment.

When the controller 4 receives a command from the host 2 (step S202), the CPU 12 determines whether or not this received command is a second specific command (step S204). The second specific command requests the secure erase to be executed for data of one or more specific LBAs by a physical secure erase method.

If the received command is not the second specific command (NO in step S204), the CPU 12 executes a process according to the received command (step S206).

If the received command is the second specific command (YES in step S204), the Audit function execution unit 245 stores one or more specific LBAs (for example, specific LBA ranges) included in the received second specific command (step S208). Each of the one or more specific LBAs is also referred to as a secure erase target LBA. In addition, the specific LBA range is also referred to as a secure erase target LBA range.

In step S210, the mapping information copy unit 241 stores a copy of the mapping information that corresponds to the secure erase target LBA (for example, the secure erase target LBA range).

The unmap unit 242 executes the unmap operation (step S212). Next, the GC unit 243 executes the GC operation (step S214).

It has been described that the mapping information copy operation in step S210 and the unmap operation in step S212 are executed as separate procedures, but these operations may be executed simultaneously as one operation such that the mapping information corresponding to the unmap target LBA is copied immediately before the unmap operation is executed.

Figure 14C:
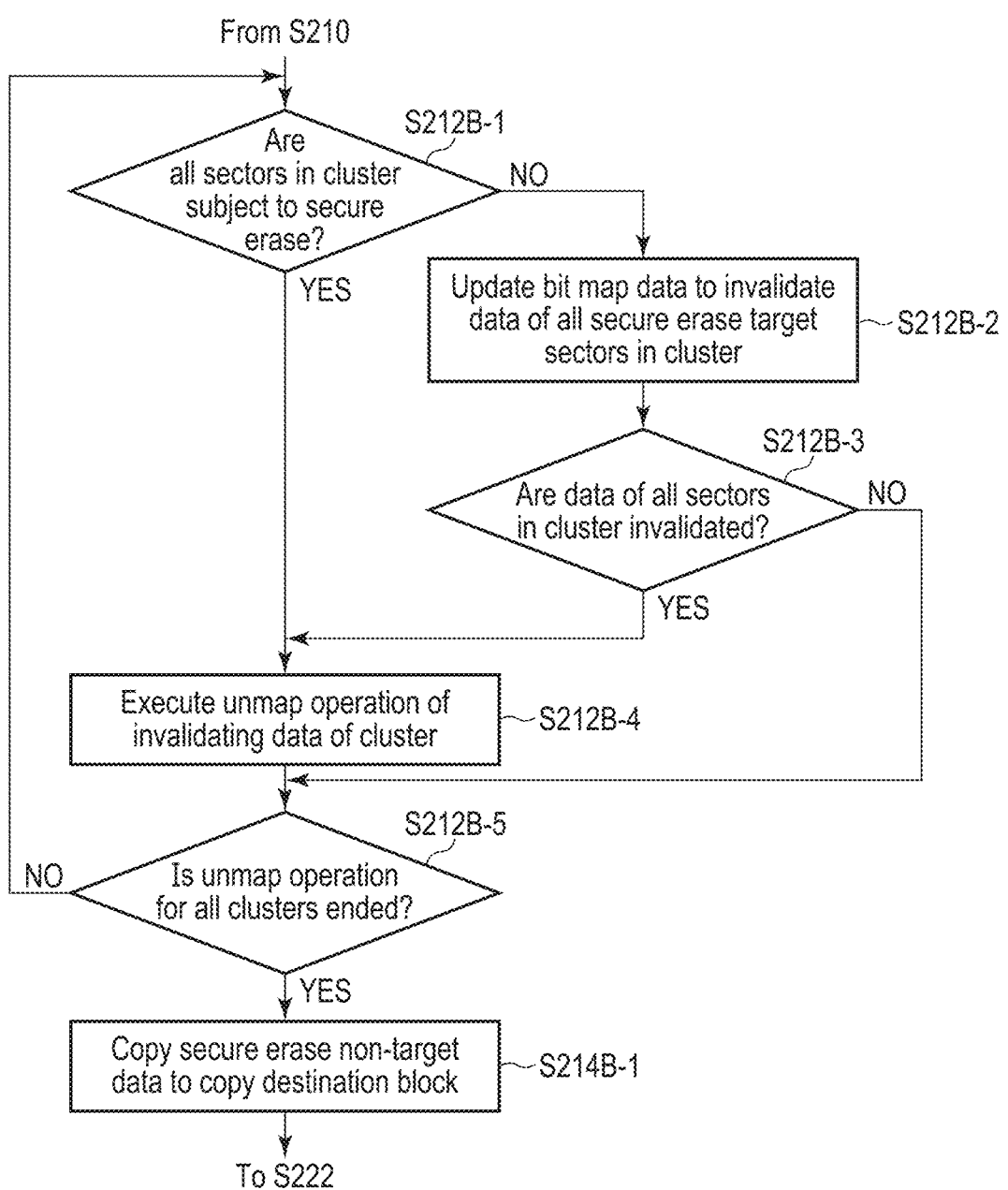
FIG. 14C is a flowchart illustrating another procedure of the unmap operation and the garbage collection operation executed in the memory system according to the third embodiment.

In addition, the procedures for the unmap operation (step S212) and the GC operation (step S214) are different depending on the relationship between the sector size and the cluster size. FIG. 14B is a flowchart illustrating the procedure of the unmap operation and the GC operation in a case where the sector size is equal to the cluster size. This procedure is the procedure in a case where one secure erase target sector corresponds to one cluster. FIG. 14C is a flowchart illustrating the procedure of the unmap operation and the GC operation in a case where the sector size is smaller than the cluster size. In this case, data of at least one secure erase target sector exists in a part of one cluster that stores the valid data.

As shown in FIG. 14B, when the sector size is equal to the cluster size, the unmap unit 242 executes the unmap operation to invalidate the data associated with all secure erase target LBAs specified by the host 2, respectively (step S212A). The unmap unit 242 deletes the physical address in each of the entries of the L2P table 37 that corresponds to all LBAs included in the second specific command. Alternatively, the unmap unit 242 stores NULL values in these entries. By this unmap operation, all clusters corresponding to the secure erase target LBAs become invalid in the L2P table 37. As a result, the data associated with all secure erase target LBAs become invalid data.

The GC unit 243 selects at least all of the active blocks that store the invalid data of the secure erase target LBA as the GC target blocks (i.e., copy source blocks). Alternatively, when simply implementing the GC operation, the GC unit 243 may select all of the active blocks that store at least invalid data, as the copy source blocks, regardless of whether or not the data is invalid data of the secure erase target LBA.

The GC unit 243 may store the block identifier of each active block selected as a copy source block, in the secure erase target block list 34.

The GC unit 243 selects any one free block among the free blocks. The GC unit 243 executes the block erase for the selected free block. The GC unit 243 allocates the free block for which the block erase has been executed as a copy destination block.

The GC unit 243 copies the valid data of the data other than the secure erase target data, i.e., copies the valid data of secure erase non-target LBA, from the copy source block to the copy destination block (step S214A).

The GC unit 243 updates the L2P table 37 to map each LBA of the copied valid data to each physical address of the copy destination.

The procedure of the unmap operation and the GC operation in the case where the sector size is smaller than the cluster size will be described with reference to FIG. 14C. Descriptions of the same procedure as that of the unmap operation and the GC operation, which has been described with reference to FIG. 14B, will be omitted.

When the sector size is smaller than the cluster size, the bitmap data indicating whether the data in each sector in the cluster is valid or invalid is stored in, for example, the L2P table 37 as described above.

The unmap unit 242 selects a cluster that includes data of at least one secure erase target sector as the target of the unmap operation and determines whether or not all sectors in this cluster are secure erase target sectors (step S212B-1).

If all sectors in the cluster are subject to the secure erase, i.e., the entire data in the cluster is subject to the secure erase (YES in step S212B-1), the unmap unit 242 executes the unmap operation to invalidate the data in this cluster (step S212B-4).

If the cluster includes one or more secure erase non-target sectors and one or more secure erase target sectors (NO in step S212B-1), the unmap unit 242 updates the bitmap data such that the data in all secure erase target sectors in the cluster are invalidated (step S212B-2).

The unmap unit 242 determines whether or not the data of all sectors in the cluster are invalidated by this invalidation (step S212B-3).

If all sectors included in the cluster have become invalid sectors (YES in step S212B-3), the unmap unit 242 executes the unmap operation to invalidate the data in this cluster (step S212B-4).

If all the sectors included in the cluster do not become invalid sectors, i.e., if the cluster includes valid sectors that are not subject to the secure erase (NO in step S212B-3), the process by the unmap unit 242 for this cluster is ended.

The unmap unit 242 determines whether or not the unmap operation for all clusters subject to the unmap operation has been ended (step S212B-5).

If a cluster for which the unmap operation is not executed exists (NO in step S212B-5), the unmap unit 242 executes the determination of step 212B-1 for the next cluster.

If the unmap operation for all clusters is ended (YES in step S212B-5), the GC unit 243 copies the data of all clusters including valid data (i.e., secure erase non-target data) in the active blocks, from the copy source block to the copy destination block (step S214B-1).

In step S214B-1, if invalid sectors exist in the cluster, the GC unit 243 changes the data in those sectors to appropriate values and copies the values to the copy destination block. Appropriate values are, for example, all 0 or all 1, random data, or a combination thereof.

The GC unit 243 updates the entry in the L2P table 37 and maps the LBA of the copied data to the physical address of the copy destination cluster.

The descriptions return to those of FIG. 14A. After the execution of the GC operation (step S214), the GC unit 243 determines whether or not the end condition of the GC operation is met (step S222), similarly to the first embodiment. The end condition may be the condition that a block storing the invalid data of the secure erase target LBA no longer exists in the active block group.

The GC unit 243 continues to execute the GC operation until a block which stores the invalid data of the secure erase target LBA no longer exists in the active block group (NO in step S222, step S214).

If the end condition of the GC operation is met (YES in step S222), the GC unit 243 ends the GC operation. At this time, there is no longer any possibility that the invalid data of the secure erase target LBA exists in other than the free blocks.

Note that if all of the active blocks that store at least invalid data are selected as the GC target blocks, regardless of whether or not the data are the invalid data subject to the secure erase target LBA, the end condition of the GC operation may be a status that blocks storing the invalid data no longer exist in the active block group, regardless of whether or not the data are the invalid data subject to the secure erase target LBA. However, this end condition reduces the efficiency of GC operation. Therefore, this end condition may be adopted when the ratio of invalid data to valid data is large in each of all active blocks.

After the determination of the end condition of the GC operation (step S222), the secure erase unit 244 executes at least the block erase operation for each free block in which the invalid data of the secure erase target LBA is stored (step S224). As a result, all of the invalid data of the secure erase target LBA are securely erased by the block erase.

In step S224, the secure erase unit 244 may execute the block erase for each free block in which the invalid data of the secure erase target LBA is stored, and may further write a specific data pattern to each of these free blocks, similarly to the first embodiment. As a result, all of the invalid data of the secure erase target LBA are securely erased by over-writing.

The secure erase unit 244 may execute the block erase on all of the free blocks, regardless of whether or not the invalid data of the secure erase target LBA is stored. As a result, the process (step S224) of executing at least the block erase for each free block in which the invalid data of the secure erase target LBA is stored can easily be executed.

Alternatively, in order to reduce the number of blocks to be block-erased, the secure erase unit 244 may execute a process to identify one or more free blocks in which the invalid data of the secure erase target LBA is stored, and execute the block erase only for the identified one or more free blocks.

In any one of the former and latter cases, at least one or more free blocks in which the invalid data of the secure erase target LBA is stored are subject to the secure erase.

When the process in step S224 is completed, the erase control unit 24 notifies the host 2 of the completion of the second specific command by transmitting a response indicating the completion of the second specific command to the host 2 (step S226).

Then, the Audit function execution unit 245 executes the Audit function (step S228). By executing the Audit function, the controller 4 transmits to the host 2 data which enables it to confirm whether or not the secure erase has been successfully executed, using the specific LBA stored in step S208 and the copy of the mapping information stored in step S210, in response to a read command issued by the host 2. Details of the procedure in step S228 will be described with reference to flowcharts in FIG. 15A and FIG. 15B.

FIG. 15A and FIG. 15B are flowcharts illustrating several steps of the process related to the Audit function executed in the memory system according to the third embodiment. Descriptions of the same procedure as that of the process related to the Audit function executed in the memory system according to the first embodiment, which has been described with reference to FIG. 7A and FIG. 7B, will be omitted.

When notifying the host 2 of the completion of the second specific command in step S226 described with reference to FIG. 14A, the Audit function execution unit 245 causes the controller 4 to transition to the Audit mode, as shown in FIG. 15A (step S302).

If the command received in step S304 is a read command (YES in step S306), in step S342, the controller 4 determines whether or not the LBA included in the received read command matches the specific LBA stored in step S208 described with reference to FIG. 14A, for example, whether or not the LBA included in the received read command belongs to the specific LBA range stored in step S208. Note that the controller 4 may change the order of execution of step S306 and step S342. In this case, the controller 4 may omit the process in step S344.

If the LBA included in the read command does not match the specific LBA, for example, if the LBA included in the read command does not belong to the specific LBA range (NO in step S342), the controller 4 refers to the mapping information in the L2P table 37 to obtain the physical address mapped to the LBA included in the received read command (step S310).

If the LBA included in the read command matches the specific LBA, for example, if the LBA included in the read command belongs to the specific LBA range (YES in step S342), in step S314, the controller 4 refers to the copy of the mapping information stored in step S210 described with reference to FIG. 14A to obtain the physical address mapped to the LBA included in the received read command.

As shown in FIG. 15B, if the received command is a write command (YES in step S318), in step S344, the controller 4 determines whether or not the LBA included in the received write command matches the specific LBA stored in step S208, for example, whether or not the LBA included in the received write command belongs to the specific LBA range stored in step S208.

If the LBA included in the write command does not match the specific LBA, for example, if the LBA included in the write command does not belong to the specific LBA range (NO in step S344), the controller 4 executes the process in step S322 and the process in step S324.

If the LBA included in the write command matches the specific LBA, for example, if the LBA included in the write command belongs to the specific LBA range (YES in step S344), in step S346, the controller 4 discards the copy of the mapping information and the information indicating one or more specific LBAs (for example, specific LBA ranges). Then, the controller 4 executes the process in step S328, the process in step S330, and the process in step S332.

If the received command is an Audit mode end command (YES in step S334), in step S348, the controller 4 discards the copy of the mapping information and the information indicating one or more specific LBAs (for example, specific LBA ranges). Then, the controller 4 exits the Audit mode (step S338) and ends the Audit function.

Since the handling of I/O commands at the time of receiving the second specific command is the same as that in the first embodiment, descriptions will be omitted.

As described above, according to the third embodiment, data in one or more specific LBAs can be securely erased by the physical secure erase method. In addition, if a copy source block stores valid data and a cluster which includes data of the secure erase target sector in part, the controller 4 changes the data of the secure erase target sector to a data pattern such as all 1 or all 0, when copying the entire data of this cluster to a copy destination block. Therefore, even if a cluster in which the secure erase target sector and a valid sector not subject to the secure erase are mixed together exists, the data of the valid sector not subject to the secure erase can be correctly copied while securing the safety of the physical secure erase operation.

In addition, the controller 4 can execute the Audit function to confirm whether or not the secure erase operation on the data of the secure erase target sector has been successfully executed.

Fourth Embodiment

Next, a fourth embodiment will be described. A configuration of an SSD according to the fourth embodiment is the same as the configuration of the SSD 3 according to the first embodiment shown in FIG. 1. In the fourth embodiment, similarly to the third embodiment, the secure erase for data of a specific LBA is executed, but the processing related to an unmap operation is different from that of the third embodiment. In the third embodiment, the controller 4 executes the unmap operation before the GC operation. In contrast, the controller 4 executes the unmap operation during the execution of the GC operation, in the fourth embodiment.

FIG. 16A is a flowchart illustrating a procedure of the physical secure erase operation executed in the memory system according to the fourth embodiment. Descriptions of the same procedure as that of the physical secure erase operation executed in the memory system according to the third embodiment, which has been described with reference to FIG. 14A, will be omitted.

After the secure erase target LBA (for example, the secure erase target LBA range) included in the second specific command received in step S202 is stored (step S208), the GC unit 243 executes the GC operation. The mapping information copy unit 241 executes the operation to copy the mapping information that corresponds to the secure erase target LBA (for example, the secure erase target LBA range), and the unmap unit 242 executes the unmap operation, during the execution of the GC operation (step S232).

Similarly to the third embodiment, the procedure of step S232, which includes the GC operation, the operation of copying the mapping information, and the unmap operation, is different depending on the relationship between the sector size and the cluster size.

Figure 16B:
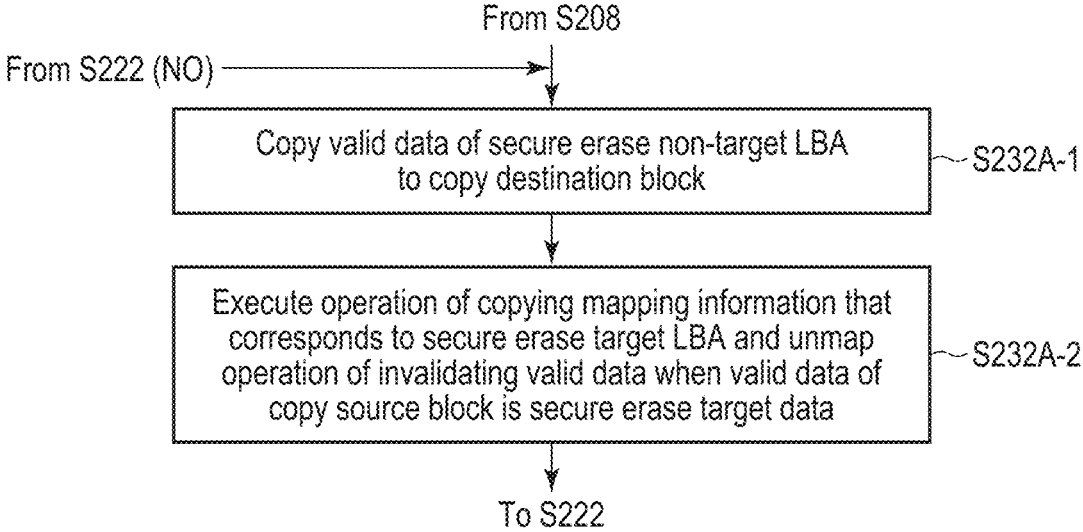
FIG. 16B is a flowchart illustrating a procedure of an unmap operation and a garbage collection operation executed in the memory system according to the fourth embodiment.

FIG. 16B is a flowchart illustrating the procedure of the GC operation and the unmap operation in a case where the sector size is equal to the cluster size. This procedure is a procedure in a case where one secure erase target sector corresponds to one cluster.

In step S232A-1, the GC unit 243 selects an active block storing at least the data of the secure erase target LBA and valid data of the secure erase non-target LBA, as a GC target block (i.e., a copy source block), regardless of whether the data of the secure erase target LBA is valid data or invalid data. Alternatively, when simply implementing the GC operation, the GC unit 243 may select all of the active blocks that store invalid data, as the copy source blocks, regardless of whether or not the invalid data are the data of the secure erase target LBA. The GC unit 243 copies the valid data of the secure erase non-target LBA from the copy source block to a copy destination block.

In step S232A-2, if the valid data of the secure erase target LBA is stored in the copy source block, the mapping information copy unit 241 executes an operation of copying the mapping information that corresponds to the secure erase target data stored in the copy source block. The unmap unit 242 executes an unmap operation of invalidating the valid data stored in the copy source block. As a result, the mapping information copy unit 241 can copy the mapping information immediately before the valid data is invalidated. When the valid data of the secure erase non-target LBA stored in the copy source block is copied to the copy destination block and when the unmap operation of invalidating the valid data of the secure erase target LBA stored in the copy source block is also executed, the copy source block becomes a free block. As a result, the data of the secure erase target LBA no longer exists in other than the free blocks. In other words, the data (invalid data) of the secure erase target LBA exists only in several free blocks.

FIG. 16C is a flowchart illustrating the procedure of the GC operation and the unmap operation in a case where the sector size is smaller than the cluster size. In this case, the bitmap data indicating whether the data in each sector in the cluster is valid or invalid is stored in, for example, the L2P table 37 as described above.

The mapping information copy unit 241, the unmap unit 242, and the GC unit 243 select a cluster which includes at least one valid sector as the target of the operation of copying the mapping information, the unmap operation, and the GC operation, and determine whether or not all sectors in this cluster are secure erase target sectors (step S232B-1).

If the cluster to be processed includes at least one secure erase target sector (YES in step S232B-1), the mapping information copy unit 241 stores a copy of the mapping information that corresponds to the cluster to be processed (step S232B-2).

The unmap unit 242 updates the bitmap data such that the data of all secure erase target sectors in the cluster are invalidated (step S232B-3).

The unmap unit 242 determines whether or not the data of all sectors in the cluster are invalidated by this invalidation (step S232B-4).

If the data in all sectors in the cluster are invalidated (YES in step S232B-4), the unmap unit 242 executes the unmap operation to invalidate the data in the cluster (step S232B-5).

After step S232B-5, if the cluster includes sectors which have not been invalidated (i.e., if the cluster includes valid data of one or more secure erase non-target sectors) (NO in step S232B-4) or if the cluster to be processed does not include any secure erase target sectors (NO in step S232B-1), the GC unit 243 copies the valid data in the cluster (i.e., the valid data of one or more secure erase non-target sectors) from the copy source block to the copy destination block (step S232B-6). At this time, the GC unit 243 replaces the data of the invalidated sectors in the cluster with appropriate values, similarly to the third embodiment. In step S232B-5, if all the sectors in the cluster are valid, the GC unit 243 copies the data of all the sectors in the cluster to the copy destination block. The GC unit 243 updates the L2P table 37 and updates the physical address from the copy source cluster to the copy destination cluster.

The GC unit 243 determines whether the operation of copying the mapping information, the unmap operation, and the GC operation have been ended for all clusters that include valid sectors (step S232B-7).

If a cluster for which these operations are not ended exists (NO in step S232B-7), the GC unit 243 executes the determination of step 232B-1 for the next cluster for which these operations are not ended.

If the operation of copying the mapping information, the unmap operation, and the GC operation are ended for all the clusters (YES in step S232B-7), the process of the GC unit 243 proceeds to step S222.

Finally, all the valid data are copied to the copy destination block, and the copy source block becomes a free block. As a result, the data of the secure erase target LBA no longer exists in other than the free blocks. In other words, the data (invalid data) of the secure erase target LBA exists only in several free blocks.

The descriptions return to those of FIG. 16A. After the execution of the GC operation (step S232), the end condition for the GC operation is determined (step S222), the block erase operation is executed (step S224), the host 2 is notified of the command completion (step S226), and the Audit function (step S228) is executed, similarly to the third embodiment.

Since the handling of I/O commands at the time of executing the second specific command and the processing related to the Audit function are the same as those in the third embodiment, their descriptions will be omitted.

In the fourth embodiment as well, the same advantages as those of the third embodiment can be obtained.

As described above, according to the first through fourth embodiments, the secure erase target data associated with the logical area identifier of the secure erase target logical area can be securely erased by the secure erase operation using the GC operation, and the Audit function to confirm whether or not the secure erase of the secure erase target data has been correctly executed can be executed after completion of the secure erase operation.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

For example, the controller 4 may transmit to the host 2 a completion response indicating that the specific command has been received and a completion response indicating that the execution of the specific command is completed, using different means.

What is claimed is:

1. A memory system connectable to a host, comprising:
a nonvolatile memory that includes a plurality of blocks, each of the plurality of blocks being a unit of a data erase operation; and
a controller electrically connected to the nonvolatile memory and configured to:
manage a first table storing mapping information that indicates mapping between each of one or more logical area identifiers and each of one or more physical addresses of the nonvolatile memory, the mapping information including at least first mapping information;
in response to receiving, from the host, a first command that requests secure erase of secure erase target data associated with a first logical area identifier,
store a copy of the first mapping information that corresponds to the first logical area identifier;
specify one or more first blocks among the plurality of blocks, the one or more first blocks storing the secure erase target data associated with the first logical area identifier;
execute at least the data erase operation for the one or more first blocks; and
transition to a first mode after executing the data erase operation for the one or more first blocks;
in the first mode, in response to receiving, from the host, a read command that specifies the first logical area identifier, read data from a storage location in the nonvolatile memory corresponding to a first physical address, the first physical address being mapped to the first logical area identifier in the copy of the first mapping information; and
in response to receiving, from the host, a command that requests end of the first mode or a write command that specifies the first logical area identifier, exit the first mode.

2. The memory system of claim 1, wherein
the controller is further configured to:
in response to receiving the first command from the host,
   invalidate the secure erase target data associated with
      the first logical area identifier, among valid data
      stored in the one or more first blocks;
   execute a copy operation of copying other valid data
      than the secure erase target data associated with the
      first logical area identifier, among the valid data
      stored in the one or more first blocks, to one or more
      copy destination blocks among the plurality of
      blocks; and
   execute the data erase operation for the one or more
      first blocks after executing the copy operation.
3. The memory system of claim 1, wherein
the controller is further configured to:
in the first mode, in response to receiving, from the host,
   a read command that specifies a second logical area
   identifier different from the first logical area identifier,
   read data from a storage location in the nonvolatile
      memory corresponding to a second physical address,
      the second physical address being mapped to the
      second logical area identifier in the mapping infor-
      mation included in the first table; and
   transmit the read data to the host.
4. The memory system of claim 1, wherein
the controller is further configured to:
store the first logical area identifier that is specified by the
   first command; and
in response to receiving, from the host, the command that
   requests the end of the first mode or the write command
   that specifies the first logical area identifier, discard the
   stored first logical area identifier.
5. The memory system of claim 1, wherein
the controller is further configured to:
in response to receiving, from the host, the command that
   requests the end of the first mode or the write command
   that specifies the first logical area identifier, discard the
   copy of the first mapping information.
6. The memory system of claim 1, wherein
the one or more first blocks include a plurality of first
   blocks, the plurality of first blocks including at least a
   second block and a third block, and
the controller is further configured to:
in response to receiving the first command from the host,
   execute the data erase operation for the second block;
      and
   execute a copy operation of copying other valid data
      than the secure erase target data associated with the
      first logical area identifier, among valid data stored in
      the third block, from the third block to the second
      block where the data erase operation has been
      executed.
7. The memory system of claim 1, wherein
the controller is further configured to:
in response to receiving the first command from the host,
   invalidate the secure erase target data associated with
      the first logical area identifier; and
   execute at least the data erase operation for one or more
      blocks that have stored no valid data since before the
      invalidation of the secure erase target data associated
      with the first logical area identifier and that store
      invalid data associated with the first logical area
      identifier, among the plurality of blocks.

8. The memory system of claim 1, wherein
the controller is configured to manage a plurality of
   namespaces that are identified by a plurality of
   namespace identifiers, respectively, and
the first logical area identifier is a namespace identifier
   that identifies a secure erase target namespace.
9. The memory system of claim 1, wherein
the first logical area identifier includes one or more logical
   addresses that identify one or more secure erase target
   sectors.
10. The memory system of claim 1, wherein
the first logical area identifier includes one or more keys
   that identify one or more secure erase target values.
11. The memory system of claim 1, wherein
the controller is configured to store the copy of the first
   mapping information in the nonvolatile memory.
12. The memory system of claim 11, wherein
the controller is configured to:
execute the data erase operation for a second block that is
   one of the one or more first blocks; and
store the copy of the first mapping information in the
   second block where the data erase operation has been
   executed.
13. The memory system of claim 1, wherein
the controller is further configured to:
invalidate the secure erase target data associated with the
   first logical area identifier by deleting, from the map-
   ping information included in the first table, a third
   physical address mapped to the first logical area iden-
   tifier; and
when deleting the third physical address from the map-
   ping information, store a part of the mapping informa-
   tion that includes the third physical address, as the
   copy.
14. The memory system of claim 1, wherein
the secure erase target data associated with the first logical
   area identifier includes invalid data.
15. The memory system of claim 1, wherein
the controller is further configured to:
transmit, to the host, a response that indicates failure of
   error correction for the data read from the storage
   location corresponding to the first physical address, as
   a response to the read command.
16. The memory system of claim 1, wherein
the controller is configured to:
read the data from the storage location corresponding to
   the first physical address that is in an erased state by the
   execution of the data erase operation for the one or
   more first blocks.
17. The memory system of claim 1, wherein
the controller is further configured to:
after executing the data erase operation for the one or
   more first blocks, write data having a specific data
   pattern to the storage location corresponding to the first
   physical address; and
in response to receiving the read command from the host,
   read the data having the specific data pattern from the
   storage location corresponding to the first physical
   address.
18. The memory system of claim 1, wherein
the controller is further configured to:
transmit to the host, a response that indicates that the data
   read from the storage location corresponding to the first
   physical address is incorrect data, as a response to the
   read command.

19. The memory system of claim 1, wherein the controller is configured to:

refer to the copy of the first mapping information; and obtain the first physical address from the copy of the first mapping information.

\* \* \* \* \*